(12) United States Patent
Rodnunsky

(10) Patent No.: US 7,088,071 B2
(45) Date of Patent: Aug. 8, 2006

(54) CABLING SYSTEM AND METHOD FOR FACILITATING FLUID THREE-DIMENSIONAL MOVEMENT OF A SUSPENDED CAMERA

(75) Inventor: Jim Rodnunsky, Granada Hills, CA (US)

(73) Assignee: Cablecam International Inc., Granada Hills, CA (US)

( * ) Notice: Subject to any disclaimer, the term of this patent is extended or adjusted under 35 U.S.C. 154(b) by 0 days.

(21) Appl. No.: 10/708,158

(22) Filed: Feb. 12, 2004

(65) Prior Publication Data

US 2005/0024004 A1    Feb. 3, 2005

Related U.S. Application Data

(63) Continuation-in-part of application No. 10/604,525, filed on Jul. 28, 2003, now Pat. No. 6,809,495.

(51) Int. Cl.
*B66C 13/08*    (2006.01)
*E04G 3/18*    (2006.01)

(52) U.S. Cl. ............... 318/649; 104/180; 212/83; 248/59

(58) Field of Classification Search ............... 318/649; 104/112, 169, 173.1, 180; 212/76, 77, 83, 212/312, 313; 248/49, 58, 59–61; 254/264; 348/144, 157; 352/243
See application file for complete search history.

(56) References Cited

U.S. PATENT DOCUMENTS

| | | |
|---|---|---|
| 367,610 A | 8/1887 | Fairman |
| 494,389 A | 3/1893 | Sherman |
| 578,980 A | 3/1897 | Eddy |
| 700,321 A | 5/1902 | French |
| 894,348 A | 7/1908 | Seele |
| 969,356 A | 9/1910 | Fitzgerald |
| 1,002,897 A | 9/1911 | Brown |
| 1,301,967 A | 4/1919 | Parks |
| 1,634,950 A | 7/1927 | Lucian |
| 1,729,984 A | 10/1929 | Paugh |
| 1,731,776 A | 10/1929 | Henry |
| 1,782,043 A | 11/1930 | Lawson |
| 1,948,934 A | 2/1934 | O'Rourke |
| 1,955,770 A | 4/1934 | Richards |
| 2,004,133 A | 6/1935 | Romano |
| 2,055,673 A | 9/1936 | Smilie |
| 2,446,096 A | 7/1948 | Moore |

(Continued)

FOREIGN PATENT DOCUMENTS

AT    150740    9/1937

(Continued)

*Primary Examiner*—Bentsu Ro
(74) *Attorney, Agent, or Firm*—Dalina Law Group P.C.

(57) ABSTRACT

Embodiments of the invention are ideally suited for use filming movies, sporting events, or any other activity that requires fluid movement of a camera or other object to any position within a defined volume of space. To accomplish such positioning embodiments of the invention are configured to move an object throughout three-dimensional space by relocating one or more lines that are feed through a plurality of opposing sides of the object. These line(s) (e.g., a cable, rope, string, cord, wire, or any other flexible connective element) which support the object over a volume of space are arranged in way that allows the object to be rapidly moved to and from any location within the defined volume of space. For instance, the system may be arranged to perform dimensional movement using one line configured as an endless loop, one line configured as a half loop, two lines configured as

30 Claims, 17 Drawing Sheets

U.S. PATENT DOCUMENTS

| | | |
|---|---|---|
| 2,490,628 A | 9/1949 | Isserstadt |
| 2,523,287 A | 9/1950 | Aschenbrenner et al. |
| 2,899,882 A | 8/1959 | Wylle |
| 3,043,444 A | 7/1962 | Mellon |
| 3,065,861 A | 11/1962 | Cruciani |
| 3,094,054 A | 6/1963 | Moors et al. |
| 3,107,791 A | 10/1963 | Michael |
| 3,333,713 A | 8/1967 | Cruciani |
| 3,638,502 A | 2/1972 | Leavitt et al. |
| 4,017,168 A | 4/1977 | Brown |
| 4,331,975 A | 5/1982 | Krawza |
| 4,625,938 A | 12/1986 | Brown |
| 4,710,819 A | 12/1987 | Brown |
| 5,440,478 A | 8/1995 | Lefkowitz et al. |
| 5,568,189 A | 10/1996 | Kneller |
| 5,585,707 A | 12/1996 | Thompson et al. |
| 6,566,834 B1 | 5/2003 | Albus et al. |
| 6,648,102 B1 | 11/2003 | Bostelman et al. |

FOREIGN PATENT DOCUMENTS

| | | |
|---|---|---|
| FR | 992069 | 10/1951 |
| FR | 2318664 | 2/1977 |
| GB | 516185 | 12/1939 |

Fig. 18A
Fig. 18B
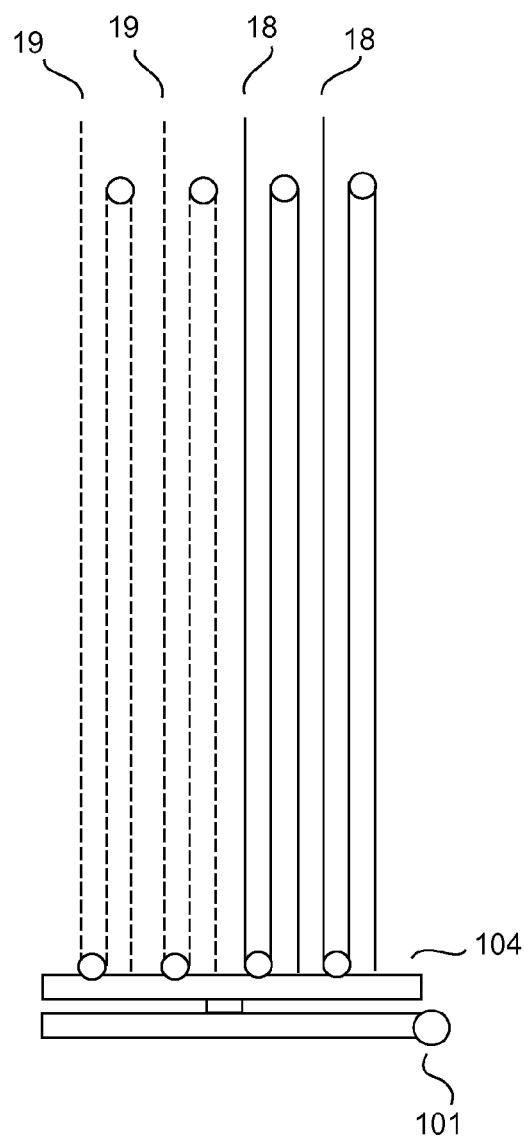
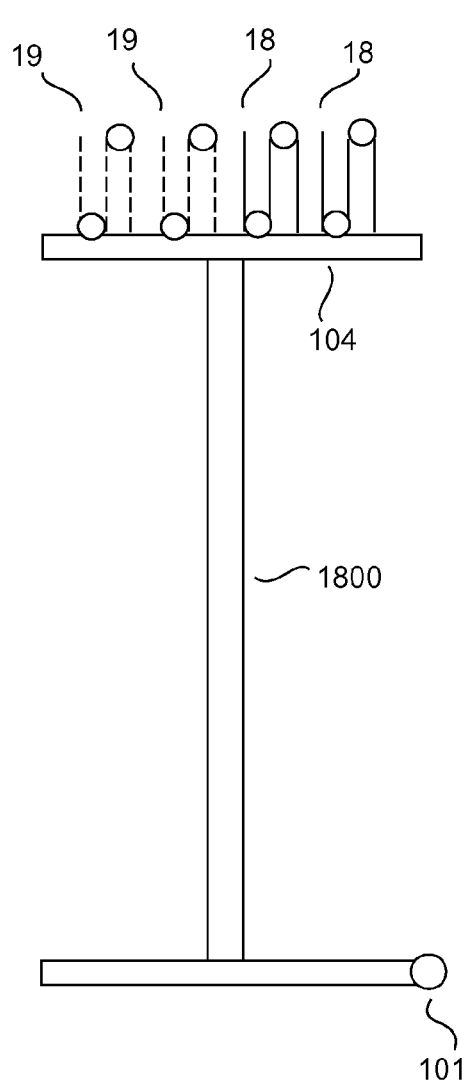

CABLING SYSTEM AND METHOD FOR FACILITATING FLUID THREE-DIMENSIONAL MOVEMENT OF A SUSPENDED CAMERA

This application is a continuation in part of U.S. patent application Ser. No. 10/604,525, now U.S. Pat. Ser. No. 6,809,495, filed on Jul. 28, 2003 entitled "System and Method for Moving Objects within Three-Dimensional Space" which is hereby incorporated by reference.

BACKGROUND OF INVENTION

1. Field of the Invention

Embodiments of the invention described herein pertain to the field of aerial cable rail systems that enable the fluid movement of a suspended camera or other object within three-dimensional space.

2. Description of the Related Art

An aerial cable rail system is a system based on an elevated cable or rope, along which objects are transported. Existing cable rail systems rely on large fixed structures and/or complex control systems in order to facilitate the movement of objects. Many of these systems are impractical or difficult to use in that such systems typically fail to satisfactorily achieve the full spectrum of platform stability, ease of control, a compact footprint, ease of transport, speed, load bearing, extensibility, maintainability and platform stability.

Objects have been supported and moved through three-dimensional space via ropes and cables for various purposes in the past. In U.S. Pat. No. 494,389 to Sherman granted in 1893, a device is described allowing for movement of a hoist through three dimensional space via a complex arrangement of cables and pulleys. A logging system is described in U.S. Pat. No. 1,782,043 to Lawson granted in 1926 employs large amounts of cable and extensive reeving in order to suspend and move logs over large distances. A similar rope crane is described in U.S. Pat. No. 3,065,861 to Cruciani granted in 1960. These systems generally employ one or more highlines which are tightly stretched and from which an object is suspended. Other patents such as U.S. Pat. No. 3,043,444 to Melton granted in 1962 and French patent 2,318,664 to Kennedy granted in 1977 took a different approach to suspending and moving objects through three dimensional space by using one cable per support pulley per winch. The '444 and '664 patents minimize the amount of cable in the system but do not allow for simple control of the cables in the system since the speeds and lengths of each cable must change non-uniformly depending upon the path of motion of the supported object.

The cable movement systems previously mentioned were generally used to haul equipment or material. Simple cable support systems have also been used to support cameras in three-dimensional space on ropes with varying degrees of success. In U.S. Pat. No. 367,610 to Fairman granted in 1887, a balloon moved with two guy lines is described that allows a camera to take pictures from locations high above the ground. In U.S. Pat. No. 578,980 to Eddy granted in 1897, a group of cameras is hoisted on a kite string attached to a reel in order to capture panoramic photographs. In U.S. Pat. No. 894,348 to Seele granted in 1908, a camera is dropped from a balloon in a sphere in order to eliminate the undesirable pendulum effects and motion effects of wind from the resulting photograph that is exposed when a shutter string is fully extended. The '348 patent may possibly be the first patent that attempts to isolate an airborne camera from the jarring effects of the vehicle carrying the camera. In U.S. Pat. No. 1,002,897 to Brown granted in 1911, a camera is directly attached to a kite string with a timer in the form of a propeller that takes a picture after a certain period of time. In U.S. Pat. No. 1,301,967 to Parks granted in 1919, a kite string based camera is described that travels along the kite string to a preset point takes a photograph and automatically descends back down the kite string so that the kite does not have to be lowered between photos.

During the 1920's work was begun on stabilizing cameras carried in vehicles since the movement of the vehicles was limiting the quality of the photographs obtained. In U.S. Pat. No. 1,634,950 to Lucian granted in 1927, a gyro-stabilized camera mount is described that actively stabilizes a camera in the pitch and roll axes in order to keep a camera actively isolated from the undesired angular motion of the aerial, land or marine vehicle carrying the camera through three-dimensional space. Many other gyro-stabilizer patents were awarded after Lucian '950 and teach active stabilization for equipment when that equipment is supported by a moving vehicle.

In U.S. Pat. No. 4,710,819, a camera suspension system is described that utilizes a minimum of at least three cables wherein each cable has two ends with one end of each cable fixedly attached to an equipment support member and the other end of each cable fixedly attached to a winch. In between the fixedly attached endpoints lies a pulley that is used as a support for the cable to provide a vertical offset between the ground and the equipment support member. Movement is achieved by reeling the cables in and out to position the camera with motion between two points generally requiring all cables to move simultaneously at different rates.

In U.S. Pat. No. 4,625,938, a camera support system is disclosed in which a camera payload can be moved within three-dimensional space in a way that allows for active stabilization of velocity of the panning (vertical axis) of the equipment support member.

In U.S. Pat. No. 5,440,476, a cable support system is described for moving objects by extending and retracting independent ropes that correspond one-to-one with the number of winches and support pulleys supporting a central object. Even simple one axis movement requires that all ropes in the system change length in a coordinated fashion to prevent slack in the other ropes supporting the object. The '476 device cannot be operated in its best mode without a computerized control system as is true for the '938 and '819 devices previously mentioned.

In U.S. Pat. No. 6,566,834, an invention is disclosed in which a payload can be moved and angularly positioned within three-dimensional space. The invention requires a computer control system in order to calculate the change in lengths of the supports ropes in order to move the payload between two points. The invention appears to require power at the platform and locates the winches for the system on the platform, further reducing the payload capacity of the platform. Furthermore, the invention does not provide simple X, Y and Z independence for control purposes and it appears that complex sensing devices must be deployed in order to keep the cables tensioned properly.

In U.S. Pat. No. 5,585,707, an invention is disclosed in which a robot or person can be readily moved within three-dimensional space. The payload is limited and the support structure is small scale. If the structure were to be scaled up, obstacles such as goal posts or light poles would inhibit the motion of the payload through a path between two points defined within the cube, since there are numerous wires required to practice the invention. Also, the invention would not appear to allow the Z-axis to vary beneath the cube, and the size of the cube support structure to service a large volume of space would be extremely expensive to build on the scale required. Again, complex control is required to keep the tension in all of the ropes at the correct level during movement of the supported equipment.

In U.S. Pat. No. 5,568,189, an invention is disclosed for moving cameras in three-dimensional space. The problems with the '189 invention become apparent when attempting to enlarge the scale of the system. FIG. 4 clearly shows how the two parallel highline cables sag inward, when the payload is in the middle of the X, Y space. Since the invention does not use strong rails to support the Y-axis rope, the weight bearing of the invention is dependent upon the strength of the building or structure in which it is mounted and the springs in its weight bearing X-axis connectors. The motors for the various axes are mounted up in the rigging, which would require multiple extremely long power cables to traverse the volume of space along with the payload if the invention were modified for outdoor use. The power cables would total over 3 times the length of the longest axis to drive the far X-axis motor, the Y-axis motor and the Z-axis motor. Mounting heavy motors high in the rigging presents a major safety issue given that suspension lines can break. The size of the motors limits the payload that can be carried, and further limits the speed at which the payload can be carried. The invention is also fixed in size, not allowing for modular addition of X travel, or increasing the Y or Z-axis travel without mounting the structure in a bigger studio or building a bigger hanger. The system requires four ropes to move an object in three dimensions.

SUMMARY OF INVENTION

Embodiments of the invention are ideally suited for use filming movies, sporting events, or any other activity that requires fluid movement of a camera or other object to any position within a defined volume of space. To accomplish such positioning embodiments of the invention are configured to move an object throughout three-dimensional space by relocating one or more lines that are feed through a plurality of sides of the object. These line(s) (e.g., a cable, rope, string, cord, wire, or any other flexible connective material) which support the object over a volume of space are arranged in way that allows the object to be rapidly moved to and from any location within the defined volume of space. For instance, the system may be arranged to perform three-dimensional movement using one line configured as an endless loop, one line configured as a half loop, two lines configured as endless loops or two lines configured as half loops.

The exact arrangement of the line(s) depends upon which embodiment of the invention is implemented. However, in each instance a set of one or more lines suspend an object by passing through a set of line support elements (e.g., one or more pulleys, sheaves, or any other support assembly configured to redirect line) and around a motorized push-pull wheel. The line support elements can comprise free wheeling elements or may be controlled elements, for example providing emergency break components, or components to monitor or control vibrations. The motorized push-pull wheel is configured to relocate line to move the object and maintain suspension of the object in an aerial position. The line is moved via the push-pull wheel in way that enables movement of the object through the transferal of line between a plurality of sides of the object. The line is reeved in such a manner as to provide three junctions (for example in one embodiment two push-pull wheels and one winch) where the line can be subjected to force thereby moving an object in three dimensions. Movement in each of the three dimensions are substantially independent, with the X line allowing X-axis motion of the supported object and the Y line allowing Y-axis motion of the platform. In one embodiment of the invention X line and Y line may be joined to form sides of the same contiguous line. The X and Y axes are not required to orthogonally intersect. Displacing equal lengths of the X and Y line via a junction (for example a winch, push-pull wheel, hydraulic device, screw device or other mechanism for displacing or relocating line) allows the Z-axis of the platform to be traversed. The Z axis is not required to project orthogonally from the plane created by the intersection X and Y axes and all support areas are not required to lie in the same plane.

The system can be scaled to any size by employing longer lines and moving the supports. The supports themselves may be dynamically repositioned as well. Embodiments may be configured in scalene triangle or convex or concave quadrilateral arrangements where no two sides are required to have the same length nor equal distances or heights between any two supports. This holds for single line or two line embodiments of the invention or any variation of these embodiments. For simplicity of description of three-dimensional movement, the separate axes that a supported object may be moved are termed the X-axis, Y-axis and Z-axis wherein each of these axes are not required to project orthogonally from a plane formed by the other two axes.

In an embodiment of the invention configured for example in a rectangular configuration with four regions having any appropriate number of line support elements, the supported object is moved along the X-axis independently of movement along the Y-axis and therefore requires no complex control system. In this example, the Z-axis movement follows an ellipsoidal path (four foci ellipsoidal where the foci are the supports) that can be as flat or circular as desired depending on the shape of the area of coverage desired. In the case of an area of coverage over a physical potential well, for example a stadium or open pit mine that is deeper in the middle than on the sides, the X-axis and Y-axis motion can be configured with more or less line in the system to create a flatter or rounder elliptical shape in order to avoid the surface below since the Z-axis automatically traverses vertically when the object moves towards the sides of the area of coverage of the invention. The ellipsoidal path can be as flat or circular as desired depending upon the amount of line deployed in the system and the relative height of the supports. Displacing equal lengths of line into a plurality of sides of the supported object allows the Z-axis of the platform to be traversed which results in trivial control of the object. This technique of relocating line without the need for a control system in order to move an object in three dimensions provides many advantages over the prior art that requires complex control software and active stabilization.

Embodiments of the invention can also use a three support triangular configuration where no two sides are required to be the same length. For any topology that embodiments of the invention are configured, there is no ratcheting movement at the object since the same line supports an object on a plurality of sides with the object freely moving to the point of minimal potential energy based on the amount of line transferred from one side to another side of the supported object. In addition, the lengths of the line do not require adjustment in way that requires complex calculations and computer control since the junctions effecting movement of each axis are independently operated.

In an embodiment of the invention line may be relocated from one area comprising X, Y and Z motors, and therefore distantly located motors and electrical cables are not required although they may be utilized if desired. Other advantages of embodiments of the invention utilizing collocated motors and junctions for relocating line include allowing motors to be large, power cables to be short and located near a large generator and maintenance to be performed in one location. The line support elements (e.g., pulleys, sheaves, or any other mechanism that can redirect line) employed in the system may contain high speed bearings and may be configured to capture the line in order to prevent derailing thereby providing an added degree of safety to the system. The push-pull wheels may optionally comprise grooves that grip the line in order to prevent slippage. Any mechanism for driving or displacing line may be substituted for the push-pull wheels. Embodiments of the invention can utilize a push-pull wheel, reel or any mechanism for effecting movement of line to multiply Z-axis travel. The location of the various components in the system may be altered including modifications to the reeving while keeping with the spirit of the invention.

The supported object may comprise many types of useful devices, and the object may then be further attached to a platform that may comprise passive or active stabilization. For instance, the terms object may refer, but is not limited to, a camera, mechanical claw, hoist or loader, mining scoop or any other equipment where three-dimensional movement may be desired. It is also possible to use embodiments of the invention to effectuate three-dimensional movement of one or more persons. The word platform as used herein refers to any vehicle to which an object may be coupled for the purposes of movement through three dimensional space in any environment subject to a vertical force, for example the force of gravity. For example, the platform itself could be supported and moved through the air or water with supports in the air or water so long as the platform is forced away from the supports. The force could be gravity for example, or the result of activation of a propeller, a thruster, positive buoyancy or any other means by which the platform is forced away from the associated supports. The supported object may utilize an electrical or fiber optic cable festooned to a support along at least one line or may travel to a non support area and may be used for the transmission of video images or other data from the supported object to the ground or data may be transmitted from the platform via wireless technologies. Alternatively the platform may send and receive video or image data via a wireless connection such as a microwave or any other suitable transport protocol.

The platform may comprise a structure which has a center of gravity well below the region where the lines pass through or couple with the platform. Alternatively the lines may couple with the platform at approximately the center of gravity of the supported object. Objects may include, but are not limited to devices that require external power or devices that possess their own power and are operated via wireless signals. Supported objects that may be moved comprise any camera system including but not limited to camera systems with vertical spars such as those found in Austrian Patent 150,740 with or without the combination of two-axis active stabilizers as found in U.S. Pat. No. 2,446,096, U.S. Pat. No. 1,634,950, U.S. Pat. No. 2,523,267 (also comprises a three axis active embodiment), U.S. Pat. No. 1,731,776 and Great Britain Patent 516,185 all of which provide active control in the two horizontal axes in order to maintain a camera support in a vertical position. The camera system of U.S. Pat. No. 4,625,938 which comprises a vertical spar and a means for stabilizing the spar may be supported and moved via using embodiments of the invention rather than the support technique described in the '938 Patent. Helicopter or airplane mounted cameras such as U.S. Pat. No. 3,638,502 may be supported and moved in embodiments of the invention utilizing passive or active stabilization whether mounted at the center of gravity or not, which is not possible using prior art techniques since embodiments of the present invention move objects in a more stable manner.

The term stabilization as used herein comprises any mechanism for stabilizing an object about is axes. Passive stabilization may utilize struts or damping agents that limit the pendulum motion of a suspended object. Active stabilization utilizes sensors to provide feedback to a powered axis in order to controllably stabilize an axis in a given direction, velocity, acceleration, jerk or any other derivative of space over time.

The term line as used herein refers to a continuous and unbroken length of line that can bend and be directed through any number of passive or powered or active line support elements or any other redirection mechanism. In one embodiment of the invention line breakage causes components associated with the line to become nonfunctional. To avoid this issue and thereby enhance system safety, the invention contemplates the use of a limiting mechanism to keep a supported object from making contact with the area of coverage. By supporting an object on a plurality of sides with a single line, there is a built in safety characteristic not found in the prior art whereby one line may break without causing the supported object to contact the ground below.

A drum winch is a device that operates on a last-in-first-out basis for storing line and controlling the length of deployed line that is coupled with the drum. Thus a drum winch operates in much the same way that a reel (e.g., a fishing reel) does. A push-pull wheel works in a completely different way than a drum winch and is functionally a motorized pulley that operates on a first-in-first-out basis for relocating line without storing the line for later extension. The push-pull wheel does not change the amount of line deployed, but rather relocates line from the intake side to the outlet side of the device.

The word motor as used herein refers to a motor which may comprise a drive pulley or drum winch or any other device that can relocate line or cable. This definition is provided for purposes of ease of illustration since a motor must drive some type of device to relocate line. In addition, in certain embodiments motors may be substituted with hydraulics, electric actuators or any other method of moving line and keeping within the scope and spirit of the invention.

Some examples of the type of line embodiments of the invention that may be utilized include synthetic rope fibers such as but not limited to HMDPE (High Molecular Density Polyethylene) fibers such as Spectra, or improved fibers such as Vectran. Line of this length, strength and weight allows the platform to be deployed over large distances. Synthetic line is 90 percent as strong as cable while having 10 percent of the weight.

BRIEF DESCRIPTION OF DRAWINGS

FIGS. 18A and 18B show an embodiment of the Z movement device employing a block and tackle for multiplication of the Z-axis traversal of the supported object.

DETAILED DESCRIPTION

Figure 1:
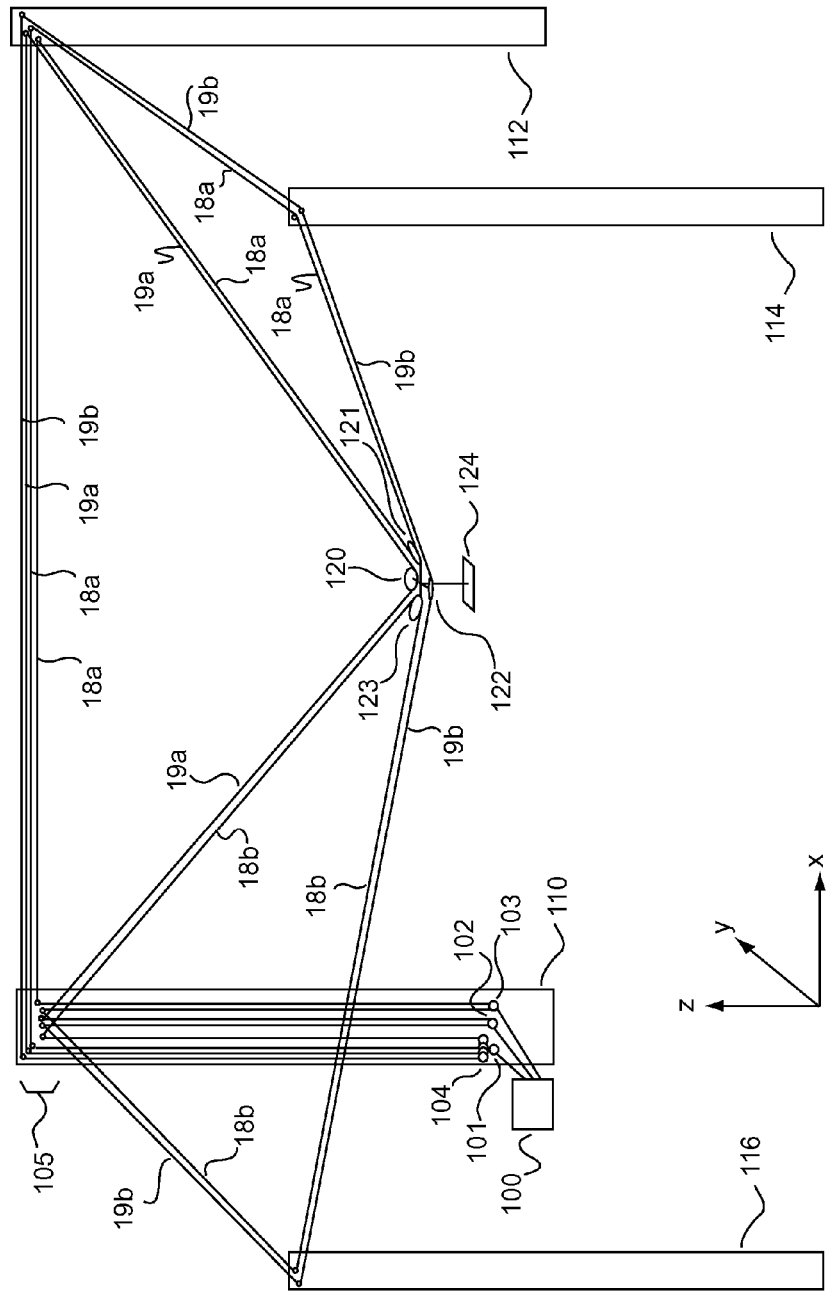
FIG. 1 is a perspective view of the overall system.

Embodiments of the invention relate to a cabling system and method for facilitating fluid three-dimensional movement of a suspended camera or other object. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention. However, in each instance the claims and the full scope of any equivalents are what define the metes and bounds of the invention.

Embodiments of the invention move an object throughout three-dimensional space by relocating line coupled with a plurality of sides of the object. In an embodiment utilizing two lines, once the displacement height of the platform is set to a minimum value for a coverage area, if one line breaks, the supported platform maintains its elevation over the ground via the unbroken line and travels to the middle of the broken line axis. The lowest the platform can descend is to the preset minimum value since opposing sides of the platform are still coupled with the remaining unbroken line.

Embodiments of the invention may comprise one line configured as an endless loop, one line configured as a half loop, two lines configured as endless loops or two lines configured as half loops. Each of these embodiments comprise two line sides designated the X line side and the Y line side, an may be termed the X line and Y line for short. In the embodiment comprising one line configured as an endless loop, approximately half of the loop is configured to effect movement of the X axis while the remaining line is configured to control the Y axis. In the embodiment comprising one line configured as a half loop, approximately half of the loop is termed the X line side while the remaining line is termed the Y line side, although they may be called the X line and Y line for short. In the embodiment comprising two lines configured as endless loops, one line is termed the X line side and the other line is termed the Y line side. In the embodiment comprising two lines configured as half loops, one line is termed the X line side and the other line is termed the Y line side, again X line side and Y line side may be termed the X line and Y line for short. FIGS. 15A–D show two line embodiments while FIGS. 16A, B show one line embodiments and will be explained in detail below. More lines may be utilized to support an object for extra safety but are not required and may pair up with the existing lines, or may use separate supports of unequal numbers with regards to the primary supports, and which may be separated from the primary supports by any distance or height.

Regardless of the embodiment, line is reeved in such a manner as to provide three junctions where the line can be subjected to force thereby moving an object in three dimensions that are substantially independent. Relocation of line on the X line side moves the object independent of the Y axis, while relocation of Y line side moves the object independent of the X axis. The X and Y axes are not required to orthogonally intersect. Displacing equal lengths of the line allows the Z-axis of the platform to be traversed. The Z axis is not required to project orthogonally from the plane created by the intersection X and Y axes.

FIG. 1 shows a perspective view of an embodiment of the system. The three axes are shown in the figure with the X-axis shown left to right, the Y-axis shown into the page and the Z-axis shown bottom to top of the page. The X-axis, Y-axis and Z-axis are not required to orthogonally project from the plane formed by the intersection of other two axes (meaning that each of the axes may project at angles other than 90 degrees with respect to the plane formed by the other two axes). In this configuration, support structures 110, 112, 114 and 116 surround the areas within which platform 124 is to move and separate platform 124 from the ground. Support structures may include passive or active line support elements and can comprise any structure that allows these line support elements to be distantly located to define an area of space. For instance, any structure that allows line to be redirected can serve as a support structure. A few examples of such structures include, but are not limited to buildings, trees, canyons, or any other structure with a height differential above the ground to which line support elements may be placed. The support structures or support points may be at the same vertical height or may comprise different heights.

Platform 124 provides a mobile support for any object or piece of equipment that would benefit from having the ability to move in three-dimensions. For example, platform 124 may comprise a structure which has a center of gravity well below the region where the lines pass through, about or couple with the platform. Alternatively the lines may couple with the platform at approximately the center of gravity of the supported object. Objects may include, but are not limited to devices that require external power or devices that possess their own power and are operated via wireless signals. Supported objects that may be moved comprise any camera system and include, but are not limited to, camera systems with vertical spars such as those found in Austrian Patent No. 150,740 with or without the combination of two-axis active stabilizers as found in U.S. Pat. No. 2,446,096, U.S. Pat. No. 1,634,950, U.S. Pat. No. 2,523,267 (also comprises a three axis active embodiment), U.S. Pat. No. 1,731,776 and Great Britain Patent No. 516,185 all of which provide active control in the two horizontal axes in order to maintain a camera support such as '740 in a vertical position. The camera system of U.S. Pat. No. 4,625,938 which comprises a vertical spar and a stabilizer may be supported and moved using embodiments of the invention rather than the cable support mechanism described in the '938 Patent. Helicopter or airplane mounted cameras such as U.S. Pat. No. 3,638,502 may be supported and moved in embodiments of the invention utilizing passive or active stabilization whether mounted at the center of gravity or not, which is not possible using prior art techniques since embodiments of the present invention move objects in a more stable manner.

Platform 124 is supported and is moved in three dimensions by one or two lines depending upon the embodiment of the invention utilized. Each line is reeved to form a pair of "V" shapes when platform 124 is centered within the system and when viewed from above with the points of the "V" nearest platform 124. In embodiments utilizing two rope sides to support the platform, the total amount of each of the rope line sides has the same length as measured from supports 110, 112, 114 and 116 to platform 124. This result is independent of the topology used, i.e., independent of the number of supports and allows for trivial Z-axis displacement. By displacing the line (either one or two lines depending upon the embodiment) from the system via Z movement device 104, platform 124 is raised. Conversely, by deploying the two line sides, platform 124 is lowered. In FIG. 1, the line on the right side of X-axis motor 103 is designated 18*a* while the line on the left side of X-axis motor 103 (e.g., an X push-pull wheel) is designated 18*b*. Sides 18*a* and 18*b* are different sides of the same continuous line where the designation changes at the motor for description purposes only. The line on the right side of Y-axis motor 102 (e.g., a Y push-pull wheel) is designated 19*a* while the line on the left side of Y-axis motor 102 is designated 19*b*. Sides 19*a* and 19*b* are different sides of the same line where the designation changes at the motor. Therefore, line designations beginning with 18 signify the X line and line designations beginning with 19 signify Y line. Depending upon the embodiment of the invention implemented there is a total of one or two lines. Control of X, Y and Z-axis motors can be in the form of simple switches, potentiometers, or a computer system that takes into account the position of the platform in order to adjust Z-axis traversal to keep platform 124 at the same Z position while traversing the X and/or Y axis, although this is not required but may be utilized for repeatability of movement sequences or any other purpose. Z-axis motor 101 and/or Z movement device 104 can be replaced by a screw or hydraulic device or any other actuator or device capable displacing line.

In a two line embodiment employing two half loops of line, Z movement device 104 may be coupled to opposing ends of X line, side 18*a* and side 18*b* and opposing ends of Y line, side 19*a* and side 19*b*. In a two line embodiment employing two endless loops, the X line for example can be hooked into an eyelet of a winch or coupled to a non-rotating pulley that may be displaced vertically without a winch (hydraulics or screw for example) in order to displace X line in the system in order to adjust the vertical placement of platform 124. This means that not only is there a two line embodiment comprising two half loops each with a pair of ends, but there is a two line embodiment where each line is in an endless loop with no ends. Although both lines may be formed into half loops, one or the other line may be formed into a half loop while the other line is formed into an endless loop. For example the X line could be an endless loop coupled with Z movement device 104 with a winch eyelet while the Y line could be a half loop with both ends coupled with a different portion of the winch. These embodiments are shown in FIGS. 15A–D.

Regardless of the number of line ends (zero or two) for each line in the two line embodiment, line support element 120 is coupled with Y line side 19*a*. These line support elements may be passive (e.g., pulleys or sheaves), however if control software is utilized to coordinate movement may also be active (e.g., motorized push-pull wheels or pulleys). Active components may be utilized to further stabilize platform 124 during movement or acceleration. Line support element 122 is coupled to Y line side 19*b*. Line support element 121 is coupled to X line side 18*a* and line support element 123 is coupled with X line side 18*b*. By rotating X-axis motor 103 clockwise in the figure, thereby decreasing the amount of line on X line side 18*a*, which increases the amount of line on X movement side 18*b*, the platform moves in the positive X direction, to the right in the figure. By rotating Y-axis motor 102 clockwise in the figure, thereby decreasing the amount of line on Y line side 19*a*, which increases the amount of line on Y movement side 19*b*, the platform moves in the positive Y direction, into the figure. Line support elements 120, 121, 122 and 123 may freely rotate or may comprise active components to further aid in stabilizing platform 124.

Figure 10:
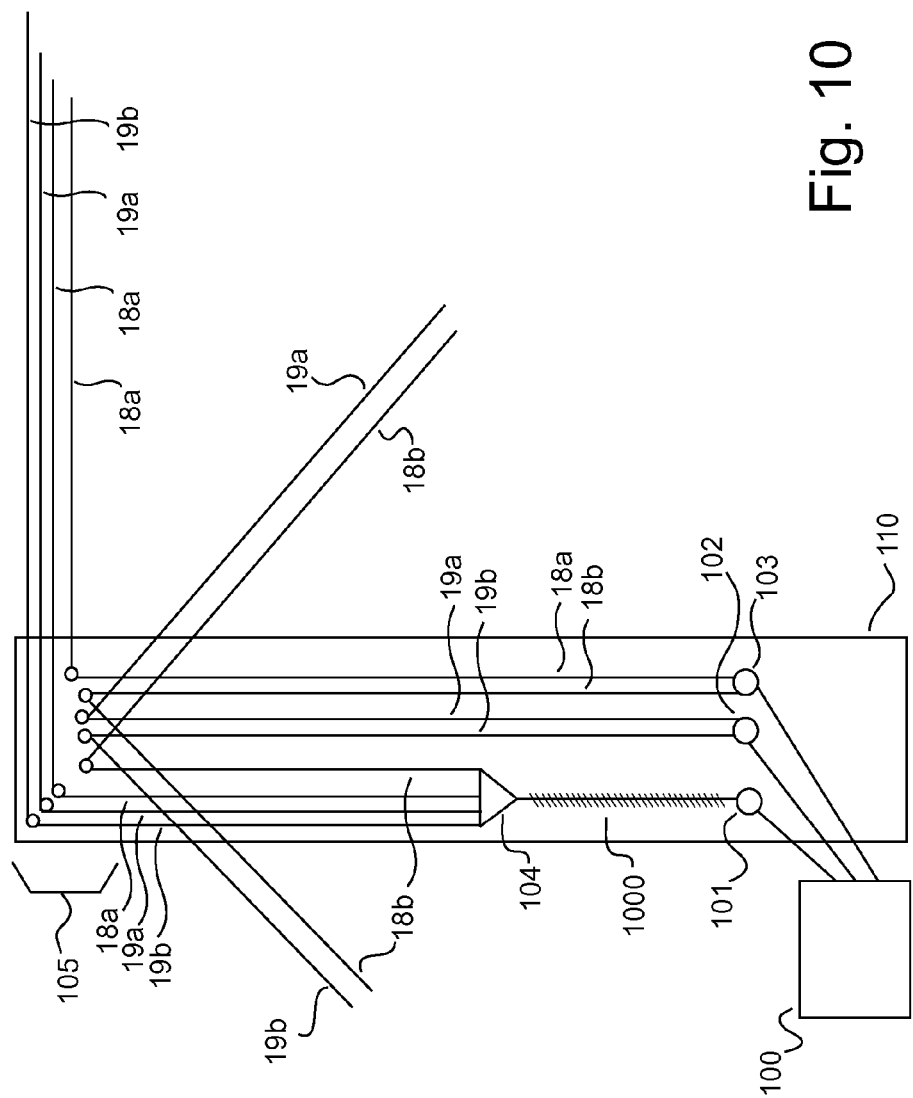
FIG. 10 is a close up view of the reeving comprising line support elements.

FIG. 10 shows an embodiment of the reeving in support structure 110 and line support assembly 105 detailed with each line redirected through therein. As this is a logical pattern for purposes of illustration, one skilled in the art will recognize that the various line support elements may be rearranged and realigned to minimize the space taken up by line support assembly 105 and line may be redirected to alternate supports in other embodiments of the invention. FIG. 10 shows one possible embodiment with screw 1000 driving Z movement device 104 upward and downward in order to displace line into and out of the system. Any type of device capable of displacing line may be used in place of Z movement device 104.

Generator and electronic drive units 100 may be utilized to power Z-axis motor 101 and or Z movement device 104, X-axis motor 103 and Y-axis motor 102. Any other source of power may be used for the motors. Z-axis motor 101 may drive Z movement device 104 configured as a drum winch with separate areas for holding line sides. Z movement device 104 displaces line into and out of the system. For ease of illustration, other possible Z movement device 104 embodiments are not shown, such as but not limited to electronic actuator components. X-axis motor 103 and Y-axis motor 102 drive bull wheels, push-pull wheels or powered pulleys, and are also not shown for ease of illustration. Push-pull wheels move line in a first-in-first-out manner without engaging a line end and act to transfer line without storing line while drum winches move line in a last-in-first-out manner and store line that is later reeled back out. Push-pull wheels (e.g., drive pulleys) and drum winches that minimize line wear and provide anti-derailing features may employed to drive the line in the system.

An embodiment of the invention can run fiber optics cables or power cables along X line side 18*b* or Y line side 19*a* from support structure 110 to platform 124. Support structures 112, 114 and 116 can alternatively supply power to the platform via identical means. Platform 124 may alternatively house devices with collocated power supplies negating the need for external power cables. Devices attached to platform 124 may include wireless or other remote controlled devices and may comprise their own active or passive stabilization. Lines comprising electrical transmission characteristics may loop many times through a line support element 120 in order to inductively transfer power to platform 124 with the number of coils about line support element 120 and the number of coils on platform 124 effectively forming a transformer with the ratio of coils determining the reduction or increase of voltage.

Figure 2:
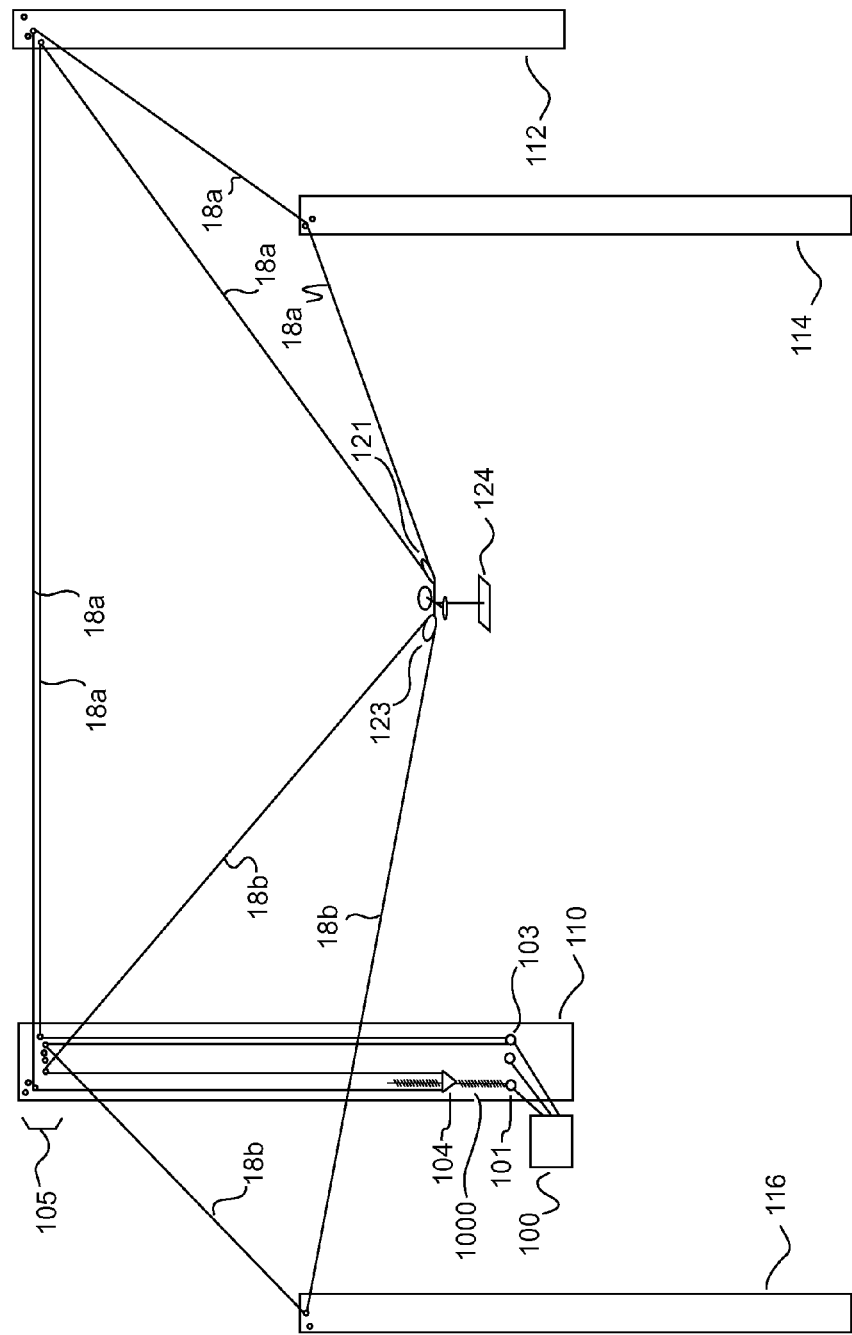
FIG. 2 is a perspective view of the X-axis reeving.

FIG. 2 shows an embodiment of the X-axis reeving. X movement in the positive X direction, to the right in the figure, is accomplished by rotating X-axis motor 103 clockwise in the diagram. As X-axis motor 103 rotates clockwise, line 18a moves down support structure 110 from line support assembly 105 from support structure 112 and hence out of line support element 121. Both lines shown between support structures 110 and 112 are designated 18a, and they are indeed the same line, although the top line only moves during Z-axis traversal. As the line leaves line support element 121 to support structure 112, it pulls platform 124 to the right in the positive X-axis direction. At the same time, X line side 18b flows upward from X-axis motor 103 to line support assembly 105 to support structure 116 and into line support element 123. Since the length of X line side 18a on the right side of platform 124 is decreasing in length while the length of X line side 18b on the left side of platform 124 is increasing, the platform moves to the right, in the positive X-axis direction. The converse applies for motion in the negative X-axis direction by rotation X-axis motor 103 in the other direction. Modifications to the reeving in the system may be made such as switching the origination points of line sides 18b heading into line support element 123 from support 110 to 116 and visa versa. Other modifications can be made to the reeving while keeping with the spirit of the invention. The total amount of line 18 in the system does not change in order to move platform 124 in the X-axis, it is merely transferred from one side of platform 124 to the other side of platform 124.

Rotating Z-axis motor 101 in one direction rotates screw device 1000 which raises Z movement device 104, which increases the length of deployed line in X line sides 18a and 18b. This lowers the platform in the Z-axis direction. As Z movement device 104 rises, X line side 18a moves upward into line support assembly 105 to support structure 112, to support structure 114 and into line support element 121. At the same time, X line side 18b, also attached to Z movement device 104 moves upward into line support assembly 105 and into line support element 123. Since both sides of platform 124 have increased line length, the platform lowers. Conversely, rotating Z-axis motor 101 in the other direction raises platform 124.

Note that Z movement device 104 can comprise a sequence of pulleys for multiplying the Z-axis traversal (see FIG. 18), and may also utilize a block or other device for disabling travel in case of line breakage in or around Z movement device 104. By placing a backup means of limiting the upward travel of Z movement device 104 the platform can be configured to never reach the ground beneath it even if a failure beneath Z movement device were to occur.

Figure 3:
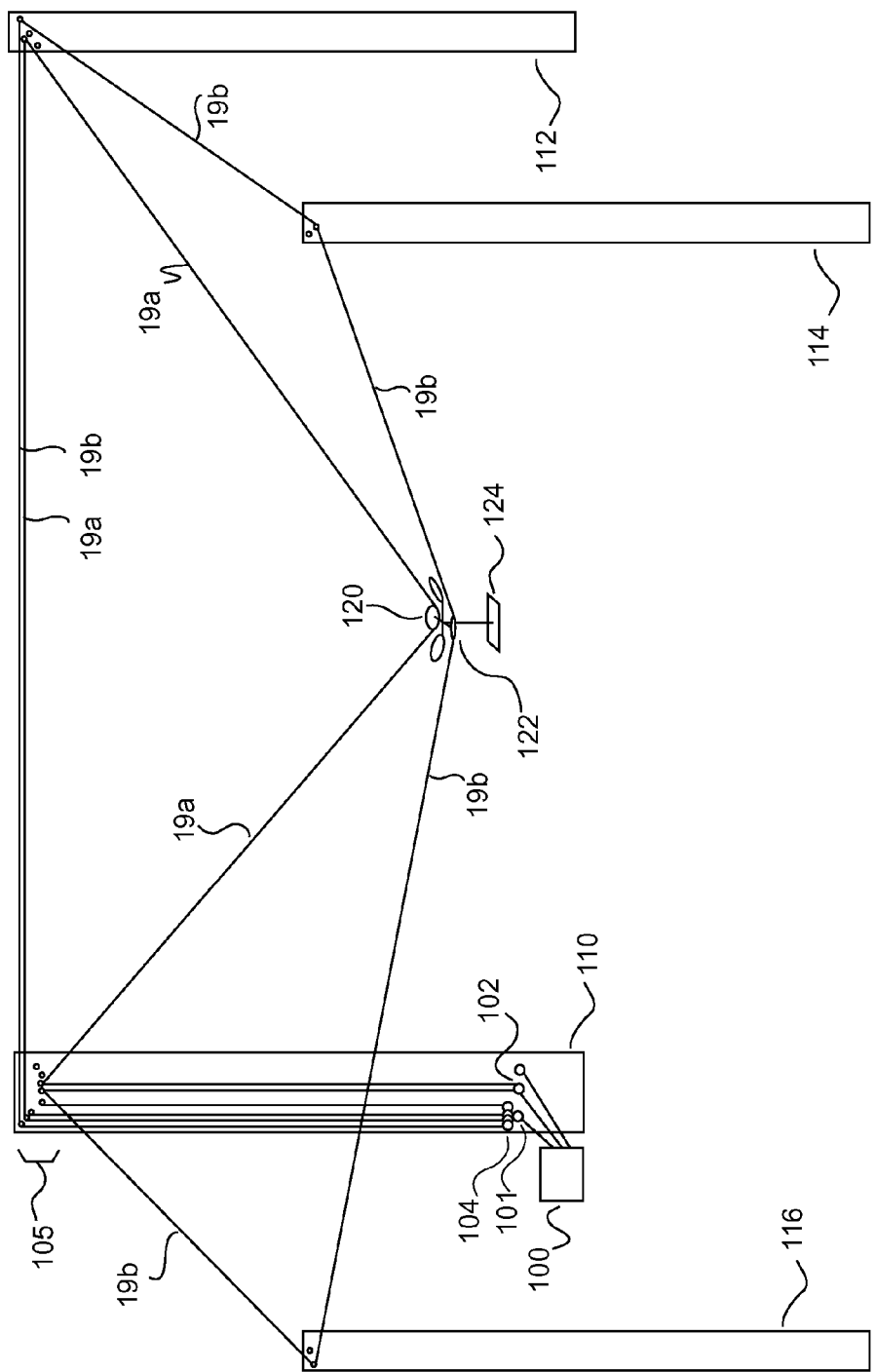
FIG. 3 is a perspective view of the Y-axis reeving.

FIG. 3 shows an embodiment of the Y-axis reeving. Y movement in the positive Y direction, into the figure, is accomplished by rotating Y-axis motor 102 clockwise in the diagram. As Y-axis motor 102 rotates clockwise, line 19a moves down support structure 110 from line support assembly 105 and out of line support element 120. As the line leaves line support element 120 to support structure 110, it pulls platform 124 into the figure, in the positive Y-axis direction. At the same time, Y line side 19b flows upward from Y-axis motor 102 to line support assembly 105 to support structure 116 and into line support element 122. Since the length of Y line side 19a on the top side of platform 124 is decreasing in length while the length of Y line side 19b on the bottom side of platform 124 is increasing, the platform moves into the figure, in the positive Y-axis direction. Note that the Y line sides 19a and 19b between support structures 110 and 112 only move during Z-axis traversal. This is also true of line 19b between support structures 112 and 114. The total amount of line 19 in the system does not change in order to move platform 124 in the Y-axis, it is merely transferred from one side of platform 124 to the other side of platform 124.

Rotating Z-axis motor 101 in one direction increases the length of deployed line in Y line sides 19a and 19b. This lowers the platform in the Z-axis direction. As Z movement device 104 (shown in FIG. 3 as a drum winch) rotates, Y line side 19a and 19b moves upward into line support assembly 105. Both line sides travel to support structure 112. Y movement side 19a travels into line support port element 120, and 19b travels to support structure 114 and into line support element 122. Since both sides of platform 124 have increased line length, the platform lowers. Conversely, activating Z-movement device to displace Y line 19 (both sides) in the opposite direction causes the platform to rise. One skilled in the art will recognize that line 19b may be reeved to bypass support 112 and may travel directly from support 110 to support 114 or may be reeved through support 116 instead of 112 before traveling to support 114.

Referring to FIG. 1, since all of the line supporting platform 124 from line sides 18a and 18b travels directly next to line sides 19a and 19b from each support, e.g., since each support has a length of line 18 and 19 traveling to platform 124, the total amount of line deployed from the supports of line 18 is equal to the total amount of line deployed from the supports of line 19 to the platform no matter where platform 124 is. This allows for trivial control of Z-axis displacement since all of the line may be moved in the same amount to effect Z-axis displacement. This is not possible with one cable per support pulley per motor per winch systems since all of the line lengths change unequally depending on where the supported object is.

A one line embodiment of the invention is formed by connecting one end of the X line to one end of the Y line, thereby yielding one line with two ends total. Another embodiment of the invention is created by connected the remaining two ends of line, i.e., the other end of X line to the other remaining end of Y line in order to form an single endless loop of line. See FIGS. 16A and 16B. Z-movement device 104 then may comprise two non-rotating line support elements that are moved to or away from line support assembly 105 in order to control the Z-axis displacement of the system. The one line embodiment is therefore formed from the two lines by connecting the two lines together to form a single strand of line and either closing the loop or leaving two ends un-joined (zero or two line ends total). Following the single length of line through the system shows that indeed three-dimensions of travel can be asserted on an object with one single continuous piece of line with zero or two total ends. The single line may have four knots tied somewhere along the stretch from Z movement device 104 to line support element 105 that limit the travel of line in case of a break, any other technique of limiting the line travel for a single break may also be used including brake systems in at least one support structure or on line support elements coupled with platform 124.

Figure 12:
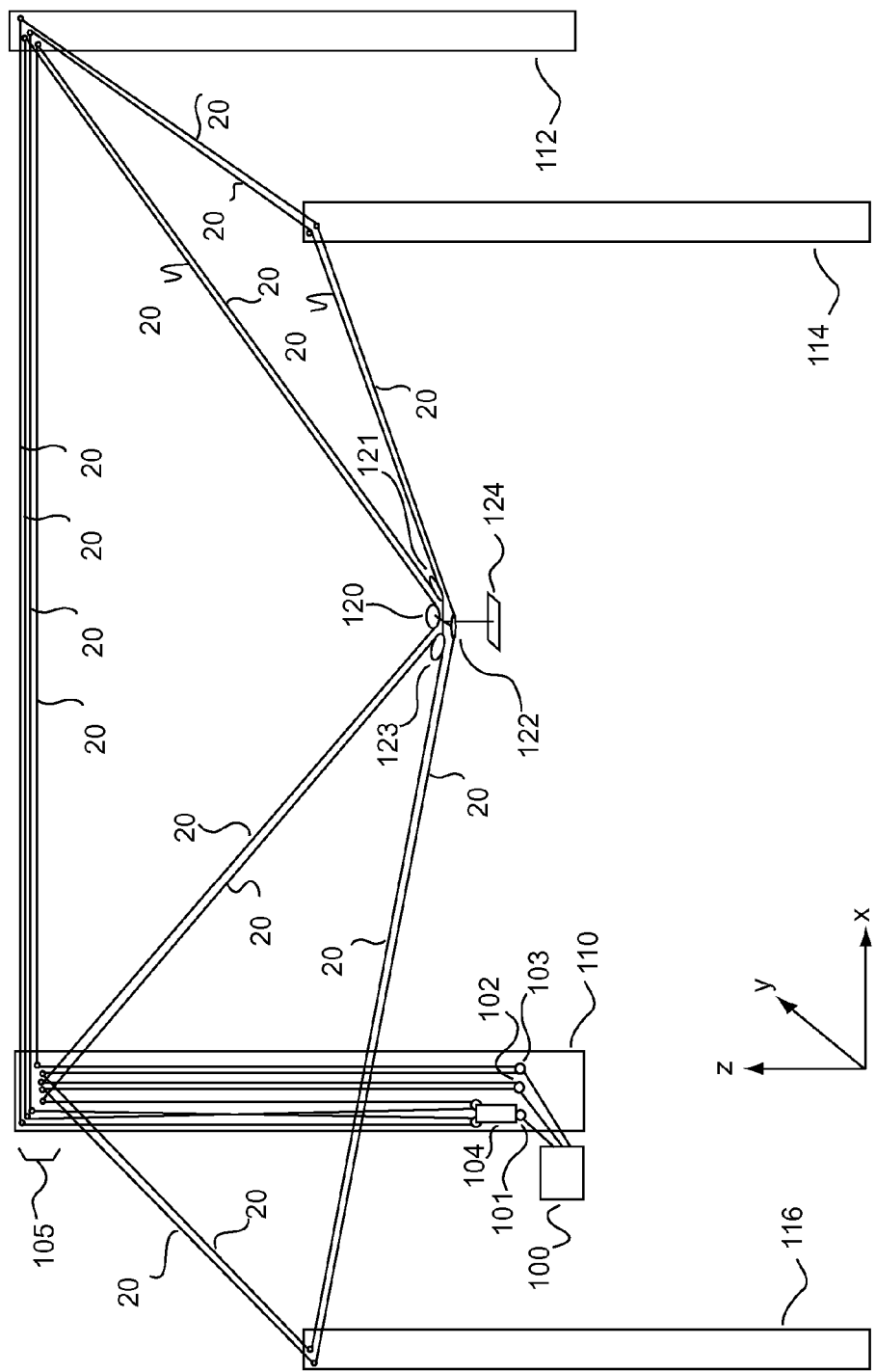
FIG. 12 shows reeving of a single line embodiment.
Figures 16A, 16B:
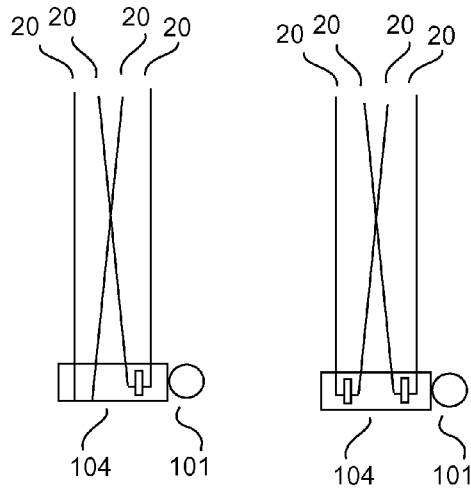
FIGS. 16A and 16B show one line embodiments.

FIG. 12 shows an embodiment of Z movement device 104 for example configured to use a hydraulic device with two non-rotating line support elements connected to the top of Z movement device 104. As Z movement device 104 extends or contracts vertically in the Figure, more or less line is deployed or displaced that supports platform 124. As all line in the embodiment is one piece of continuous line that has no ends, it is designated line 20, however, line 20 comprises X line side 18 and Y line side 19 where the designation changes at the Z movement device with X line side 18 designated as line 20 between Z movement device 104 that is coupled with X-axis motor 103 and with Y line side 19 designated as line 20 between Z movement device 104 that is coupled with Y-axis motor 102. Z movement motor 101 in this embodiment comprises a hydraulic system. Another embodiment of Z movement device 104 may be a screw or electronic actuator or any other device that could possibly move the two line support elements associated with the device through a distance. One skilled in the art would recognize that reeving in several more line support elements to form a block and tackle between Z movement device 104 and line support element 105 in order to make a Z multiplication factor is readily possible as per FIGS. 18A and 18B. Another embodiment of the invention whereby only one line support element is used on Z movement device 104 exists where two of the line ends of line 20 are coupled with Z movement device 104 and where the single line support element is the designated dividing point for X line side 18 and Y line side 19 as per FIG. 16A. Coupling two line ends to Z movement device along with a pulley allows for a single half loop of line 20 with two line ends to move platform 124 in three-dimensional space. Coupling the remaining two ends to form one endless loop of rope is shown in FIG. 16B. The eyelets of Z movement device 104 shown in FIG. 17 may allow free travel of line 20 through each eyelet until Z movement device 104 is rotated until travel through the eyelets is not possible. This allows the X and Y axis push-pull wheels to have immobile junctions in which to pull against so that line does not freely travel through the entire system. As the hydraulic device of Z movement device 104 may be replaced by a single winch with eyelets or separate areas for X line side 18 and Y line side 19 of line 20, it should be clear to one skilled in the art that a hydraulic device is not required to practice the invention and that any mechanism which displace Z movement device 104 may be substituted.

As shown in FIG. 12, line 20 is a single piece of line comprising X line side 18 and Y line side 19, which may be termed X line and Y line for short since these sides of line 20 are utilized to move through the X axis and Y axis respectively even though they are simply different sides of the same line 20. Line 20, i.e., Y line side 19 (side 19b in FIG. 1) extends from the far left side of Z movement device 104 up to line support element 105 to support structure 112 to support structure 114 to line support element 122 to support structure 116 to line support element 105 down to Y-axis motor 102 back up to line support element 105 (now side 19a in FIG. 1) to line support element 120 to support structure 112 to line support assembly 105 right line support element on Z movement device 104 back up to line support assembly 105 (now line 18, side 18b in FIG. 1) to line support element 123 to support structure 116 to line support assembly 105 to X-axis motor 103 back up to line support assembly 105 (now side 18a in FIG. 1) to support structure 112 to line support element 121 to support structure 114 to support structure 112 to line support assembly 105 to the left line support element on Z movement device 104, thereby completing the single loop of line reeved through this embodiment of the invention. For the endless loop embodiment, one or both of the two line support elements shown on top of Z movement device 104 may be non-rotating so that X-axis motor 103 and Y-axis motor 102 have a fixed point in which to pull against, otherwise platform 124 would not move as all line support elements in the system would free spin. The endless loop of line could be cut at one of the non-rotating line support elements with both resulting line ends attached to Z movement device 104 yielding a single piece of line embodiment that is formed into a half loop of a single line instead of an endless loop of line of a single line, this also provides points at which to immobilize line so that the single line with two ends embodiment does not freely spin. See FIG. 16A. Although line 20 is one continuous piece of line it possesses X line side 18 and Y line side 19 upon which forces may be applied in order to relocate line onto each side of platform 124 in order to move it.

Figure 4:
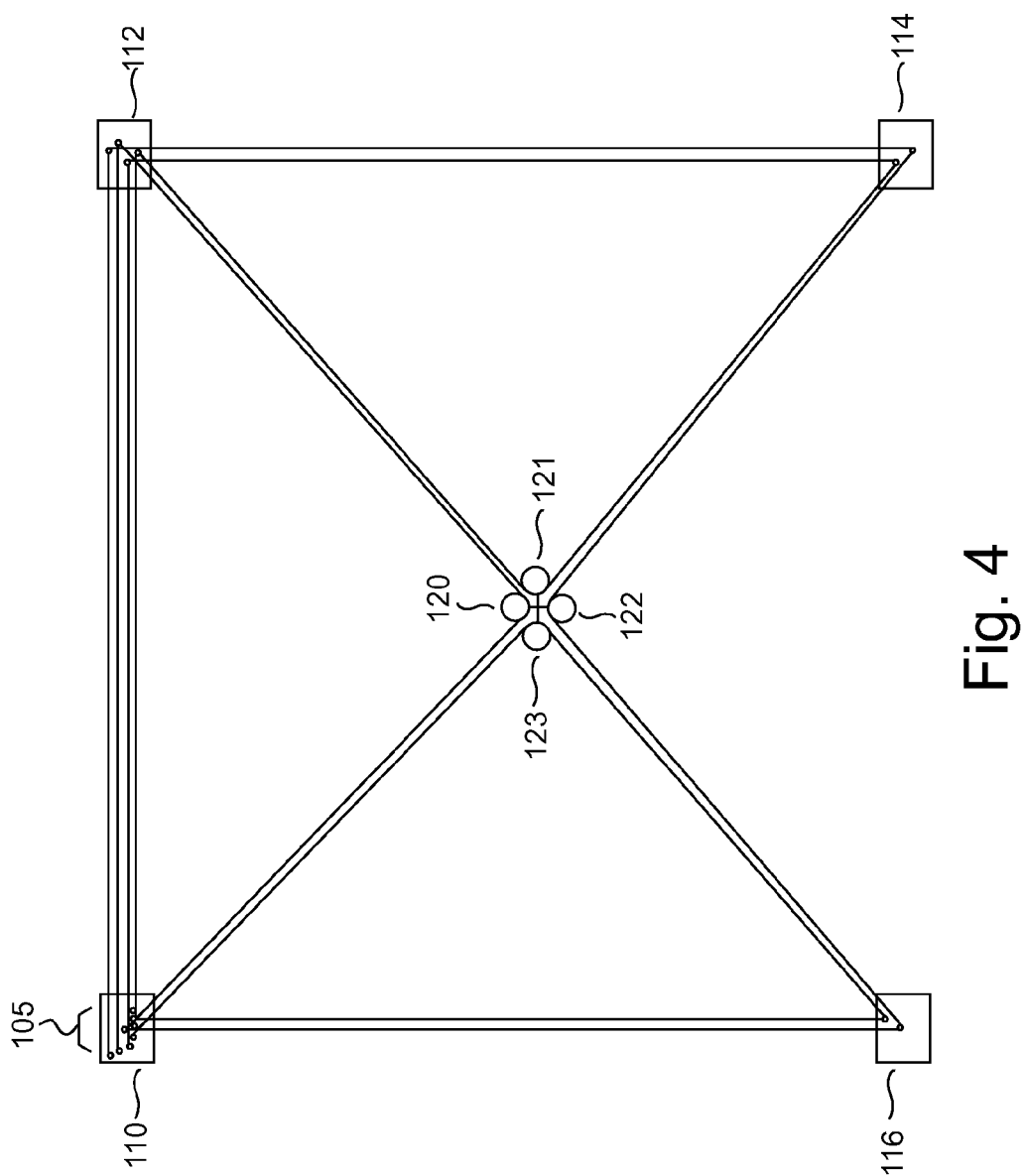
FIG. 4 is a top view of a rectangular embodiment of the system.

FIG. 4 shows a top view of an embodiment of the system in a rectangular configuration. Although line support assembly 105 has been designated in the figure, each of the support structures may have line support assemblies of lesser complexity. Support structure 112 for example may have four line support elements while support structures 114 and 116 may have two line support elements. Each of the line support elements can comprise any device that can guide the line into the line support element securely. Line support element assembly 105 for example may have eight line support elements, four for Z-axis traversal, two for X-axis movement and two for Y-axis movement or any other number of line support elements that allow X and Y line to move. See FIG. 10 for an example close-up of support structure 110 and line support assembly 105. The exact layout of the support elements used can be varied for space considerations or any other design requirement while keeping with the spirit of the invention. Any element capable of redirecting line may be used in place of a line support element.

Figure 5:
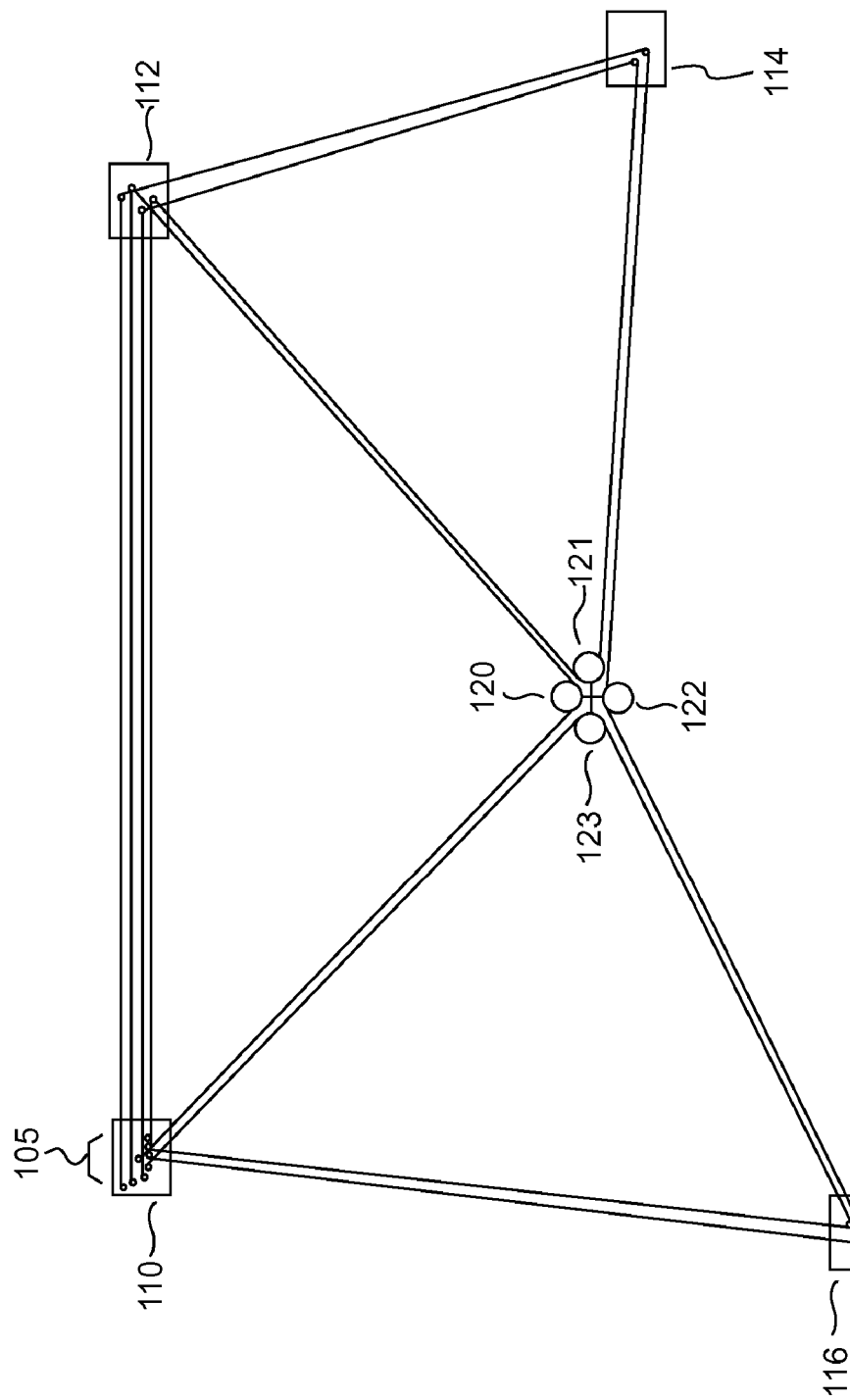
FIG. 5 is a top view of a quadrilateral embodiment of the system where no two sides are required to have the same length.

FIG. 5 shows a non-rectangular embodiment of the system. In this embodiment, if lines were drawn between the four support structures 110 to 112, 112 to 114, 114 to 116 and 116 to 110, a convex quadrilateral would result. Concave quadrilateral embodiments may be configured by moving support structure 114 across a line drawn between support structure 112 and 116. Since the X-axis and Y-axis lines are equal length for each stretch between support structures, it follows that the support structures may be moved while maintaining full functionality of the system. This means that the support structures may be mobilized and physically moved before or during operation of the system.

Figure 9:
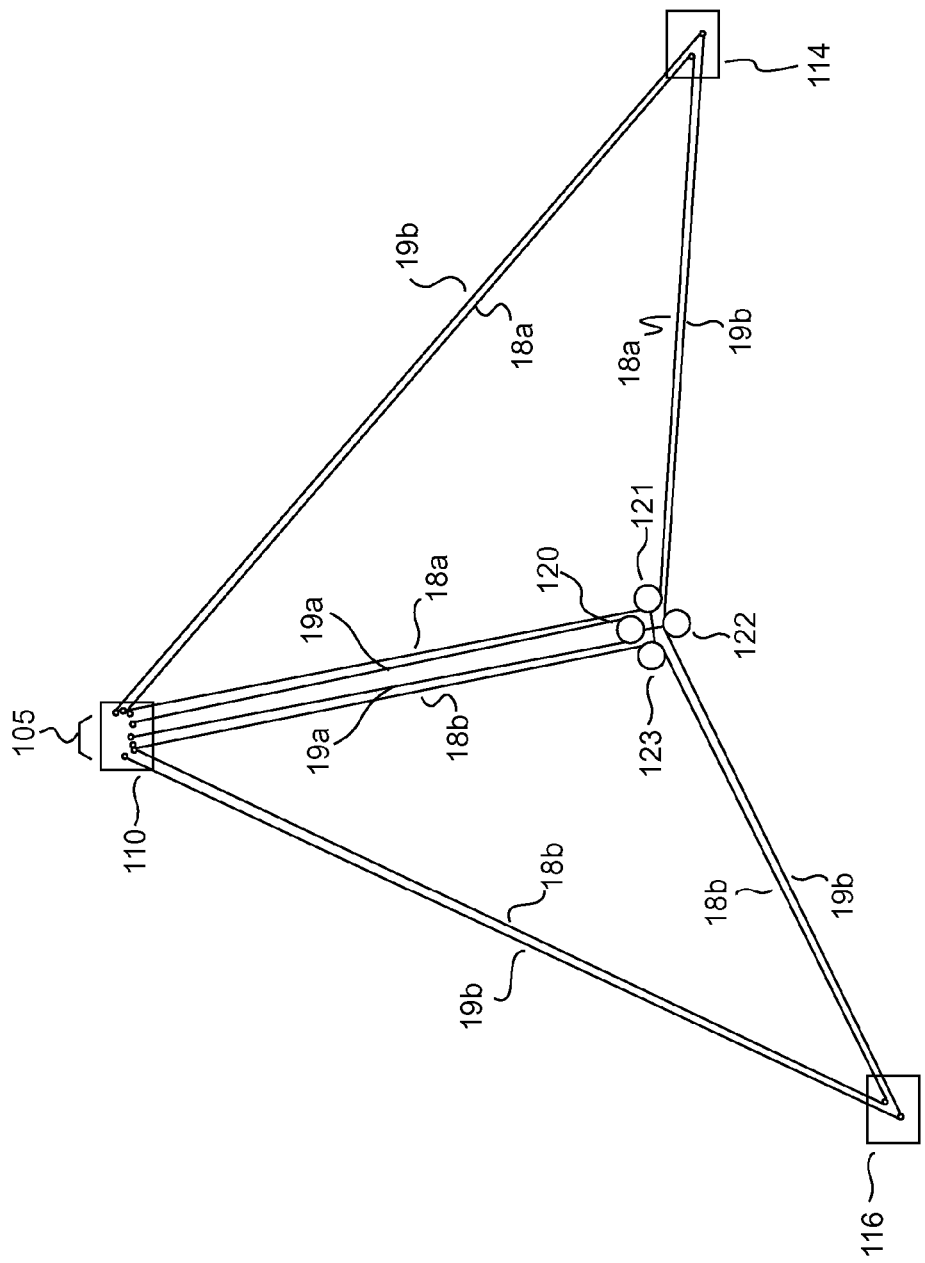
FIG. 9 is a top view of a scalene triangular embodiment of the system where no two sides are required to have the same length.

FIG. 9 shows a triangular shape embodiment that is constructed with three support structures instead of four for example by eliminating support structure 112 and the four line support elements in it. The length between support structure 110 and 116 is the shortest, the length between support structures 110 and 114 is longer and the length between support structures 114 and 116 is the longest stretch. Since the three sides of the triangle are not required to be of the same length a scalene triangle is formed although isosceles and equilateral triangular embodiments may also be constructed by placing the support structures at the required positions. Eliminating support structure 112 and the four line support elements in it accomplished by coupling line support assembly 105 lines to support structure 114 directly. Since the total lengths of the X and Y line are the same within the system, the same Z movement device may be utilized to raise and lower the platform. That area of coverage is a three sided triangle where no two sides are required to be of the same length.

Figure 14:
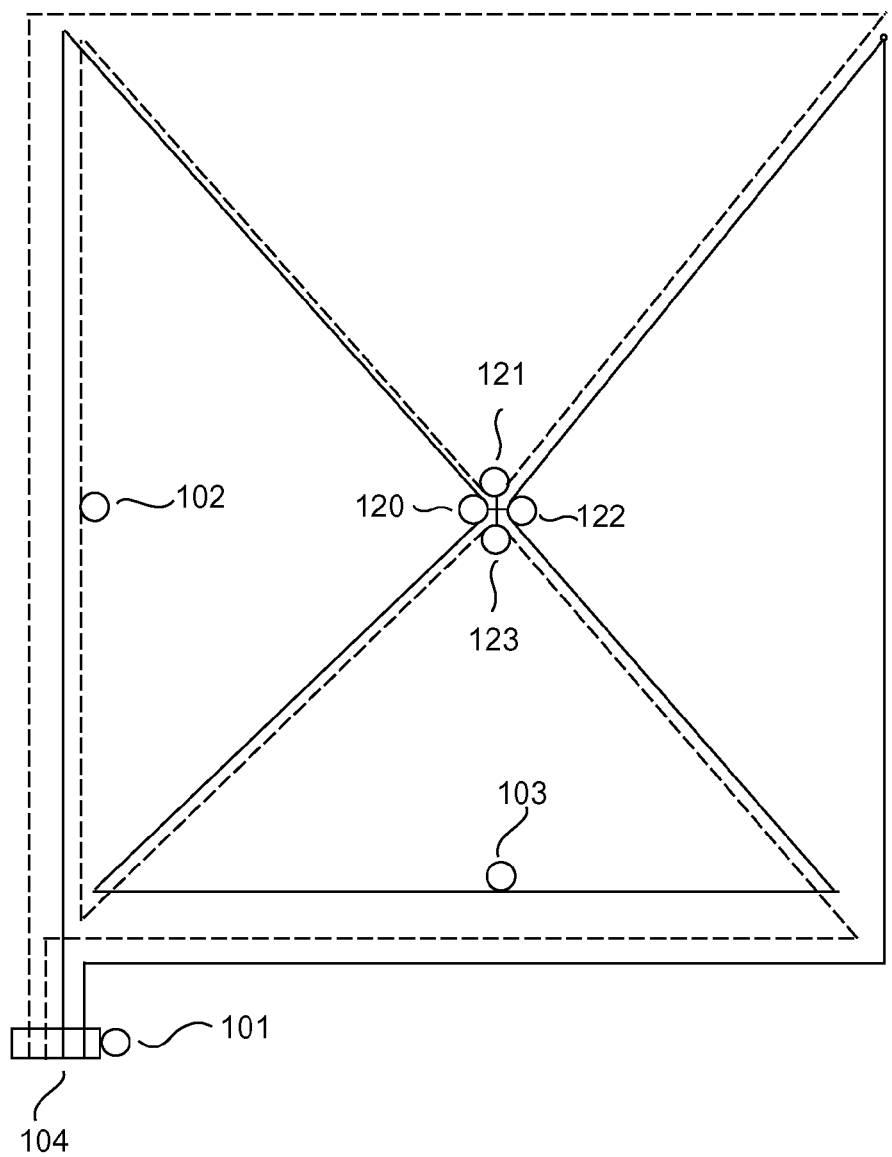
FIG. 14 shows a logical reeving diagram.

FIG. 14 shows a logical diagram of a two line embodiment with slightly different reeving in that there is no open side without line. In addition, this embodiment shows that X axis motor 103 and Y axis motor 102 may be repositioned within the reeving. This figure also shows that minor modifications to the reeving are possible while keeping within the scope and spirit of the invention. This embodiment also shows Z movement device 104 as a winch attached to the two sets of line ends. One line is shown in dashed lines for clarity. Movement of X axis motor 103 comprising a push-pull wheel for example transfers line from the left side of the diagram to the right side of the diagram and visa versa. The transfer of line does not alter the amount of line in the system. Line support elements 121 and 123 allow Y line to pass through as X line is transferred out of line support element 120 and into line support element 122 for example. This holds for independent movement of Y line as well via Y axis motor 102 comprising a push-pull wheel for example. Since the total amount of X line and Y line remains the same as measured from the supports to the supported object, X movement is independent from Y movement, while Z movement may be performed by a single mechanism. Three and four support arrangements also comprise equal lengths of line supporting an object where no two sides are required to be equal length. Activation of Z movement device 104 displaces equal amounts of line via one side of each line support element 120, 121, 122 and 123 and raises or lowers the platform.

FIGS. 15A–D show two line embodiment logical reevings that may occur at the bottom left portion of FIG. 14 while FIGS. 16A–B show one line embodiment logical reevings.

Figures 15A, 15B, 15C, 15D:
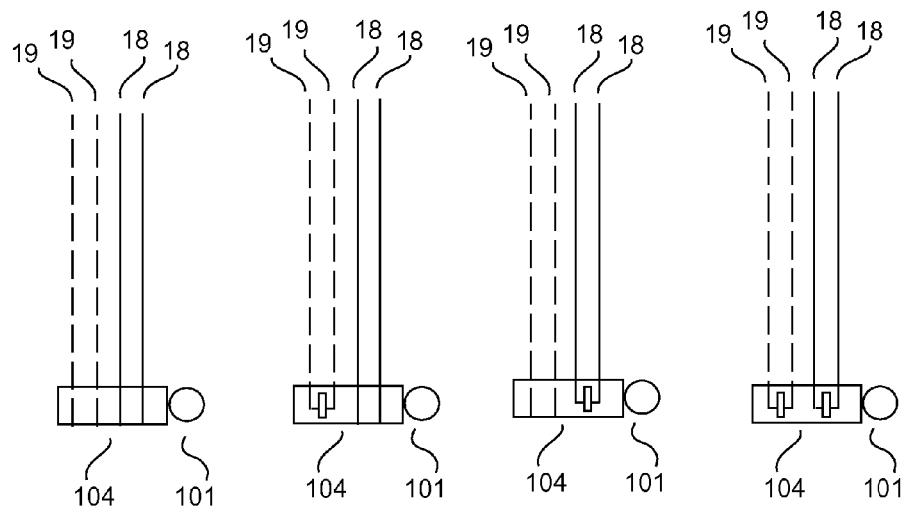
FIGS. 15A–D show two line embodiments.
Figure 17:
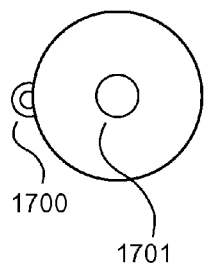
FIG. 17 shows a side view of one embodiment of the Z movement device having at least one eyelet.

FIG. 15A shows an embodiment of the invention utilizing two lines 18 and 19 wherein each line's ends are attached to Z movement device 104. FIG. 15B shows an embodiment wherein line 18 has its ends attached to Z movement device 104 while line 19 is configured as a loop through an eyelet. The side view of Z movement device 104 is shown in FIG. 17 with eyelet 1700 shown on the left, with axle 1701 shown in the center. FIG. 15C shows line 18 configured as an endless loop with line 19 having its ends attached to Z movement device 104. FIG. 15D shows an embodiment wherein both lines 18 and 19 are configured as endless loops that loop through eyelet 1700 as shown in FIG. 17. FIG. 15D may be configured to limit travel of line 18 and/or 19 through the eyelets to provide the X and Y motors with fixed locations to pull against. If there are no fixed locations in the system at all, the line in the system will freely spin. However, once a rotation of Z movement device 104 has occurred, wherein for example Z movement device is configured as a winch, then of course, lines 18 and 19 would not freely spin through the eyelets once line was wound about the winch.

FIG. 16A shows an embodiment of the invention near the Z movement device employing only one line configured as a half loop wherein two ends of line 20 are attached to Z movement device and line 20 passes through eyelet 1700. FIG. 16B shows an embodiment of the invention employing line 20 as an endless loop throughout the system with line 20 passing through a pair of eyelets 1700 on Z movement device 104. FIG. 16B may be configured to limit travel of line 20 through the eyelets to provide the X and Y motors with fixed locations to pull against. If there are no fixed locations in the system at all, the line in the system will freely spin. However, once a rotation of Z movement device 104 has occurred, wherein for example Z movement device is configured as a winch, then of course, line 20 would not freely spin through the eyelets once line was wound about the winch.

Although the embodiments shown in FIGS. 15A–D and 16A–B are easily transformed near Z movement device 104, other arrangements utilizing one line or two lines in the system may be accomplished by separating the junctions where force is applied to line. By utilizing an embodiment where X, Y and Z forces are applied in a centralized location, maintenance is easily performed however embodiments of the invention relocating various components are clearly within the scope of the invention.

FIG. 18A shows an embodiment utilizing Z axis multiplication. Embodiments of the invention may utilize a block and tackle arrangement in the Z axis so that a limited amount of travel of Z movement device 104 may displace a multiplied amount of line into the system. The multiplication of Z axis travel may also be utilized for coverage areas that are deeper than the distance from the Z movement device to the supports, e.g., for an embodiment with 30 meter supports, a 10 factor block and tackle can be utilized yielding 300 meters as the maximum distance displaced in the Z-axis. For example, in FIG. 18A, with Z movement device 104 in the lowest position as shown, approximately three times the amount of line exists as opposed to FIG. 18B when Z movement device is raised, yielding in this example a multiplication factor of three. Rod 1800 may be a hydraulically actuated rod in an embodiment of the invention, while Z movement motor 101 may drive a hydraulic pump. There is no requirement that Z movement motor must actually be an electric motor, as any device capable of displacing line may be used in place of an electric motor with the understanding that motor as defined herein defines any mechanism capable of displacing line.

Figure 6:
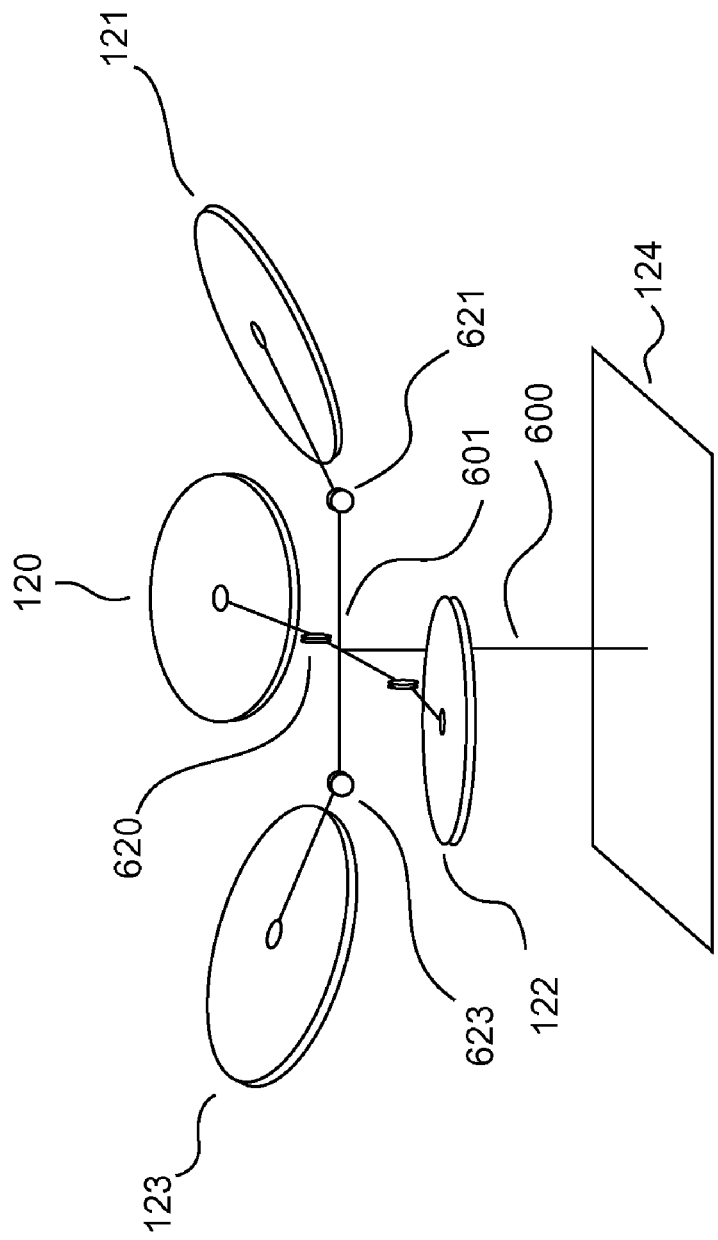
FIG. 6 is a perspective view of an embodiment of the platform.

FIG. 6 shows close up perspective of platform 124. This embodiment of the platform is suspended beneath the crossbar 601. Each of the line support elements 120, 121, 122 and 123 may be hinged with universal joints. Line support element 120 may be hinged to crossbar 601 by universal joint 620. Single axis rotatable axles may be used in place of universal joint 620. Platform 124 is suspended from crossbar 601 by platform post 600. Any useful device or object may be mounted on the platform. The platform itself may comprise active or passive stabilization in between crossbar 601 and post 600. Post 600 may or may not extend above crossbar 601, and any extension above the crossbar may or may not be balanced with regards to the center of gravity of the total resulting mass attached to post 600. In other words, the center of gravity may lie above, below or at the center of gravity of the resulting object supported. When the center of gravity lies above the support point care must be taken to place the center of gravity close enough to the support point so that the platform does not tip over, which can also be accomplished via active control if desired. In general, placement at the center of gravity or where the support point is above the center of gravity allows passive or even pure free wheeling isolation to be employed. Crossbar 601 may be substituted with any structure capable of coupling with lines including but not limited to a circular or rectangular object.

Figure 7:
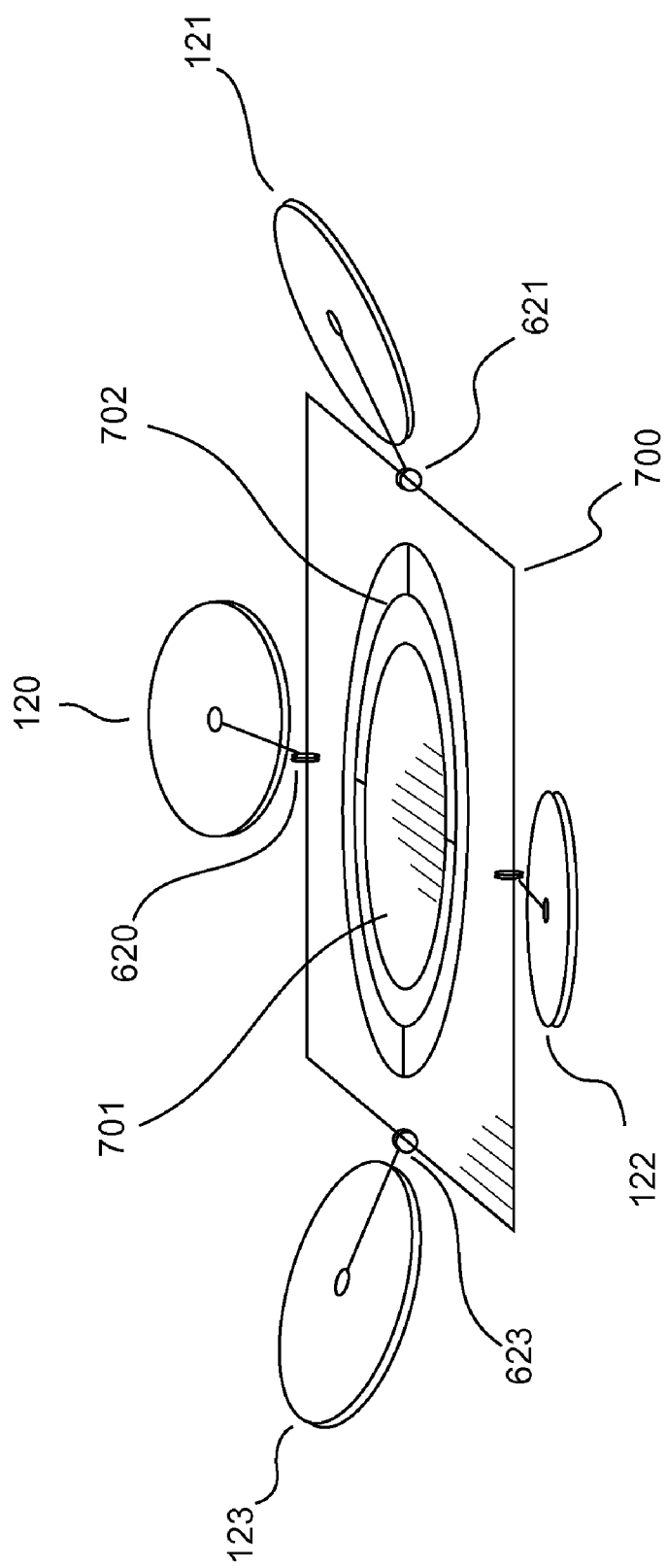
FIG. 7 is a perspective view of an embodiment of the platform.
Figure 11:
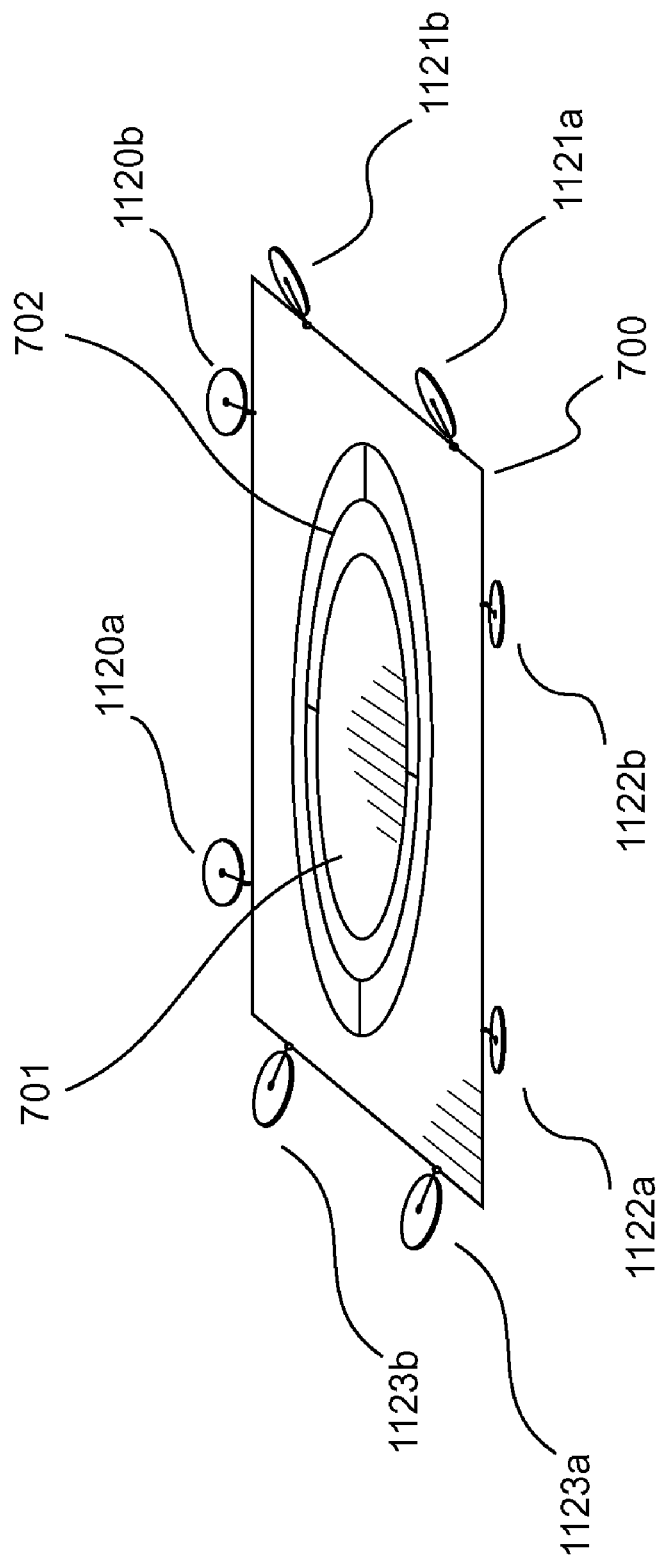
FIG. 11 is a perspective view of an embodiment of the platform comprising two line support elements per side.

FIG. 7 shows a close up perspective of platform 700, another embodiment of a platform. This platform is supported by line support elements 120, 121, 122 and 123 via universal joints. Platform 700 contains an isolator, for example at least a one axis free spinning gimbal mount 702 with inner platform 701 which may support any useful device and may be further comprise powered axes which may be moved by direct or wireless command. The embodiment may comprise an isolator with one or more axes of platform 701 are isolated and free rotating, or passively stabilized with dampers or actively stabilized in terms of pitch, roll and pan axis rotation. The active stabilization may be position, velocity, acceleration, jerk or any other order to distance per time derivative. Platforms may be rotatable from the inside as shown or via the outside of platform 700 (which would comprise a circular outer shape not shown for brevity. FIG. 11 shows a variation of FIG. 7 with two line support elements per side. In this embodiment, each side of platform 700 couples with an opposing line via two pulleys per side. Embodiments may employ line support elements of any number or any size on the platform.

Figure 8:
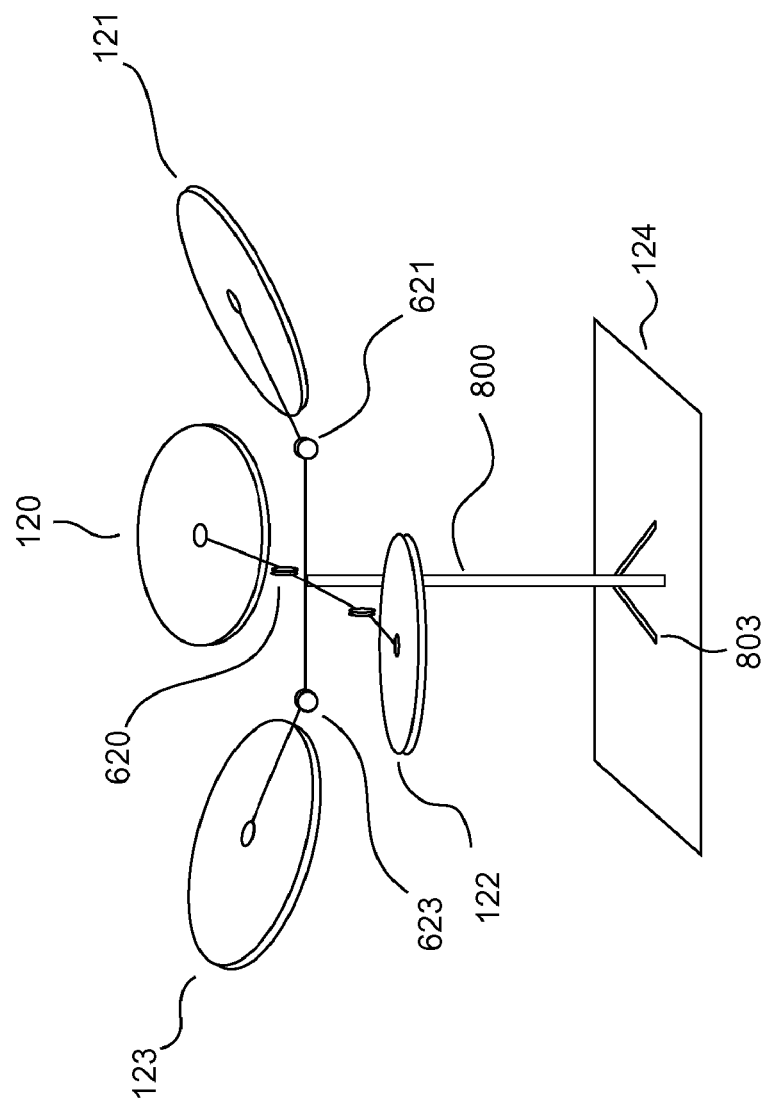
FIG. 8 is a perspective view of an embodiment of the platform utilizing a passive or active stabilized platform.
Figure 8A:
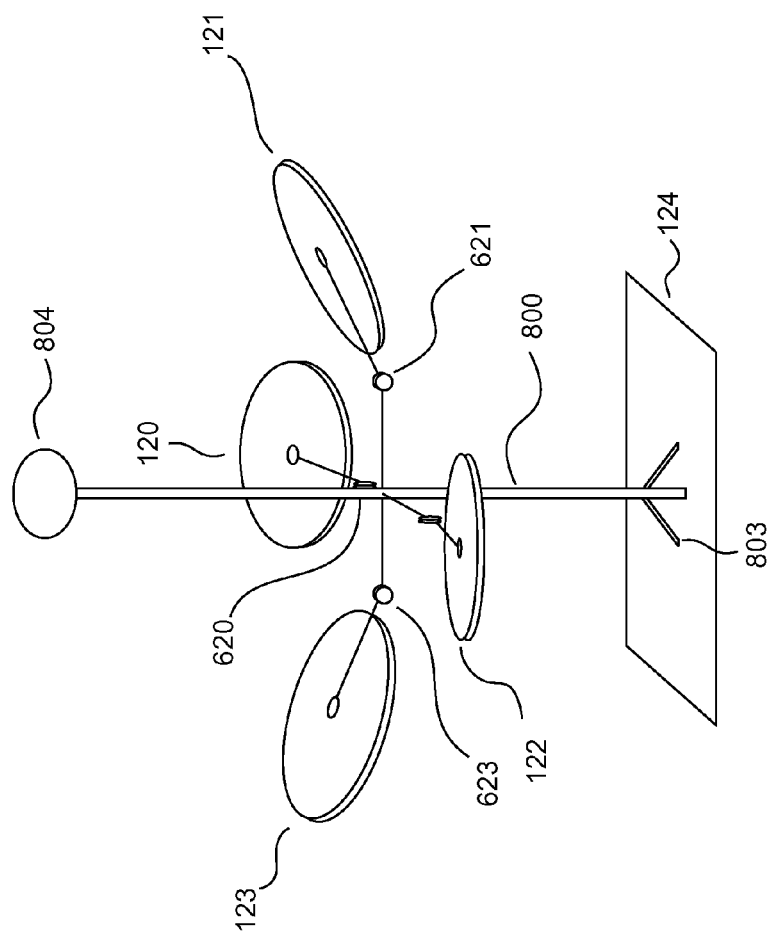
FIG. 8A is a perspective view of an embodiment of the platform utilizing a passive or active stabilized platform and counterweight.
Figure 13:
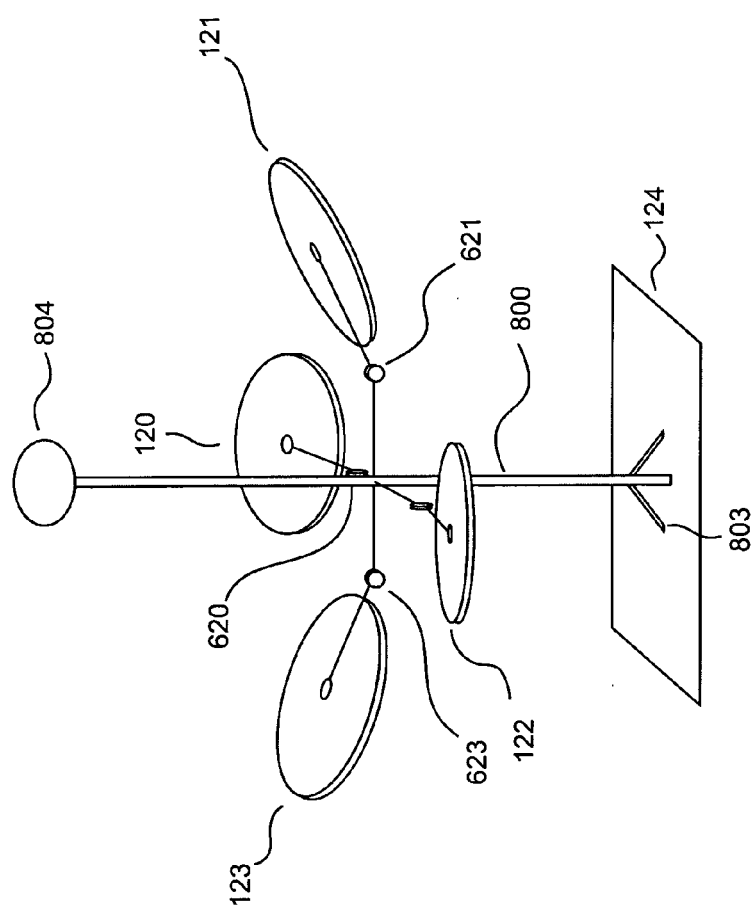
FIG. 13 is a perspective view of an embodiment of the platform utilizing a passive or active stabilized platform and counterweight.

FIG. 8 shows a close up perspective of platform 124 supported by a passive or active stabilization system 803, which may exist at crossbar 601 (not shown for brevity) or at platform 124 as shown, supported by rod 800 which may comprise a counterweight (shown in FIG. 13) at the top of rod 800 with rod 800 mounted on crossbar 601 slightly above the center of gravity of the combination of platform 124, rod 800 and counterweight 804. Crossbar 601 may be hinged with a universal joint or may comprise a gimbal as shown in FIG. 7. Many more platform embodiments are possible and the platforms shown in FIGS. 6, 7, 8 and 11 are merely a small set of examples of the myriad of configurations possible. Any camera assembly including but not limited to those with vertical or horizontal orientations and with our without active or passive stabilization may also be supported and moved with embodiments of the invention. Since the X and Y line (in one or two line embodiments) supports platform 124 from upward angles on each of the platforms sides, there is no need for a tag line or gimbal assembly to provide further stabilization although embodiments of the invention may utilize such a device. In fact, the line support elements on platform 124 act as tag lines for moving platform 124 through three dimensional space.

FIG. 1 shows an embodiment of the invention that uses single line support elements at all line direction points. Other embodiments may use multiple line support element arrangements virtually anywhere where a single line support element is used in order to change direction of a line and further prevent derailing. Line support elements with groove shapes and rounded edges that minimize the lateral friction on lines passing through the line support elements may be utilized in order to minimize the amount of wasted power in the system. Embodiments of the invention may use any type of line support element that works with the line specified for the system. Any linear connection device may be utilized in place of line, such as but not limited to cable. A dynamometer may be inserted in-line between Z-axis motor 101 and Z movement device 104 in order to provide tension readings.

Platform 124 can have many different apparatus attached to it to perform a variety of functions including but not limited to stabilization devices, gimbals, camera equipment, mining loaders, ship-to-ship loaders, logging devices, ski lift seats, gondolas, body sensing flight simulator suits for allowing a person to simulate flying, reduced gravity simulator suits, lifting harnesses, munitions depot bomb retrievers, digital video equipment for security checks in railroad yards or nuclear facilities, robotic agricultural harvest pickers for quickly picking and storing grapes or other produce or any other device that benefits from repeatable placement and motion in three dimensional space. In another embodiment, platform 124 comprises a witness camera mounted pointing down from the platform, providing a picture from the viewpoint of the platform. Camera systems previously described may be mounted at above or at approximately the center of gravity of each device with active, passive or a combination of active and passive stabilization in any number of axes, some of which may be multiply actively or passively stabilized. Platform 124 may comprise line support elements that may or may not be located on opposing sides of the platform as long as a line supporting platform 124 travels to supports that oppose each other in order to prevent ground collision in the case of a break on another line side.

Thus, a cabling system and method for facilitating fluid three-dimensional movement of a suspended camera or other object has been described. The claims, however, and the full scope of any equivalents are what define the metes and bounds of the invention.

What is claimed is:

1. A system for facilitating three-dimensional movement of a suspended object comprising:
    an object having a set of associated line support elements;
    an X line coupled to a plurality of sides of said object and configured to move via said set of associated line support elements;
    an X junction configured to relocate said X line to effectuate X movement of said object;
    a Y line coupled to a plurality of sides of said object and configured to move via said set of associated line support elements;
    a Y junction configured to relocate said Y line to effectuate Y movement of said object; and,
    a Z movement device configured to displace said X line and said Y line to effectuate Z movement of said object.

2. The system of claim 1 wherein said X line and said Y line are two line sides of a contiguous line.

3. The system of claim 1 wherein said set of line support elements allow said X line and said Y line to pass through said set of line support elements and comprise components which control movement of said X line and said Y line.

4. The system of claim 1 further comprising:
    said X junction comprising an X movement motor having an X movement device coupled with said X line;
    said Y junction comprising a Y movement motor having a Y movement device coupled with said Y line; and,
    a Z movement motor coupled with said Z movement device.

5. The system of claim 4 further comprising an electrical generator and electronic drive units coupled to said X movement motor and said Y movement motor and said Z movement motor.

6. The system of claim 1 further comprising a dynamometer for measuring the tension of said Z movement device.

7. The system of claim 1 further comprising an isolator associated with said object.

8. The system of claim 7 wherein said isolator comprises passive stabilization.

9. The system of claim 7 wherein said isolator comprises active stabilization.

10. The system of claim 7 wherein said isolator comprises active stabilization in at least one first axis and passive stabilization in at least one second axis.

11. The system of claim 7 where said isolator is configured to support a vertical camera assembly supported at approximately the center of gravity of said vertical camera assembly.

12. The system of claim 7 wherein said isolator is configured to support a camera assembly away from the center of gravity of said camera assembly.

13. The system of claim 1 wherein said object is coupled with a mechanical claw.

14. The system of claim 1 wherein said object is coupled with a hoist or loader.

15. The system of claim 1 wherein said object is coupled with a mining scoop.

16. The system of claim 1 wherein said object further comprises a downward pointing camera for remotely viewing from the position of said object.

17. The system of claim 1 wherein said object comprises at least one person.

18. The system of claim 1 further comprising at least three supports.

19. A method for facilitating three-dimensional movement of a suspended object comprising:
   relocating an X line associated with a platform with an X junction to effectuate X-movement of said platform;
   relocating a Y line associated with said platform with a Y junction to effectuate Y-movement of said platform; and,
   displacing said X line and Y line with a Z movement device to effectuate Z-movement of said platform.

20. The method of claim 19 wherein said X line and said Y line are two line sides of a line.

21. The method of claim 19 further comprising:
   isolating an object coupled to said platform from line movement.

22. The method of claim 19 further comprising:
   stabilizing an object passively coupled to said platform from line movement.

23. The method of claim 19 further comprising:
   stabilizing an object actively coupled to said platform from line movement.

24. The method of claim 19 further comprising:
   obtaining pictures from a photographic device coupled to said platform.

25. A system for facilitating three-dimensional movement of a suspended object comprising:
   means for relocating an X line associated with a platform with an X junction to effectuate X-movement of said platform;
   means for relocating a Y line associated with said platform with a Y junction to effectuate Y-movement of said platform; and,
   means for displacing said X line and Y line with a Z movement device to effectuate Z-movement of said platform.

26. The system of claim 25 wherein said X line and said Y line are two line sides of a single line.

27. The system of claim 25 further comprising:
   means for isolating an object coupled to said platform from line movement.

28. The system of claim 25 further comprising:
   means for stabilizing an object passively coupled to said platform from line movement.

29. The system of claim 25 further comprising:
   means for stabilizing an object actively coupled to said platform from line movement.

30. The system of claim 25 further comprising:
   means for obtaining pictures from a photographic device coupled to said platform.

\* \* \* \* \*